United States Patent
Iwamatsu et al.

(10) Patent No.: US 8,179,580 B2
(45) Date of Patent: May 15, 2012

(54) OPTICAL SCANNING DEVICE AND IMAGE FORMING APPARATUS

(75) Inventors: Akihiro Iwamatsu, Iwate (JP); Kenichi Yoshimura, Kanagawa (JP); Kohei Shimizu, Kanagawa (JP); Tokiko Inoue, Kanagawa (JP); Mitsuru Nakajima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/106,209

(22) Filed: May 12, 2011

(65) Prior Publication Data

US 2011/0286067 A1    Nov. 24, 2011

(30) Foreign Application Priority Data

May 20, 2010  (JP) ................. 2010-116176
May 27, 2010  (JP) ................. 2010-121500
Aug. 5, 2010  (JP) ................. 2010-175968
Feb. 10, 2011 (JP) ................. 2011-026909

(51) Int. Cl.
   *G02B 26/08*    (2006.01)
(52) U.S. Cl. ..................... 359/196.1; 359/315
(58) Field of Classification Search .... 359/196.1–226.2, 359/315–318
   See application file for complete search history.

(56) References Cited

U.S. PATENT DOCUMENTS 5,208,456 A *  5/1993  Appel et al. ............... 250/236
7,050,082 B2   5/2006  Suzuki et al.

FOREIGN PATENT DOCUMENTS

| JP | 7-218856 | 8/1995 |
|---|---|---|
| JP | 9-501245 | 2/1997 |
| JP | 3164002 | 3/2001 |
| JP | 2002-182140 | 6/2002 |
| JP | 3450402 | 7/2003 |
| JP | 2006-133287 | 5/2006 |
| JP | 2006-133288 | 5/2006 |
| JP | 3833542 | 7/2006 |
| JP | 2008-64995 | 3/2008 |
| JP | 2008-181104 | 8/2008 |
| JP | 4170637 | 8/2008 |
| JP | 4369658 | 9/2009 |
| WO | WO 95/04951 | 2/1995 |

* cited by examiner

*Primary Examiner* — James Phan
(74) *Attorney, Agent, or Firm* — Oblon, Spivak, McClelland, Maier & Neustadt, L.L.P.

(57) ABSTRACT

An optical scanning device includes a light source; a scanning unit to deflect/scan a laser beam from the light source; an imaging optical system to focus the deflected and scanned laser beam to a scan-target surface; an electro-optic element to electrically change a refractive index thereof; a controller to control the refractive index of the electro-optic element to adjust deflection amount of the laser beam; and a positional shift detecting unit, disposed away from the light path, to detect a positional shift of the incident laser beam from an ideal position in a sub-scanning direction. The device further includes a beam splitting element, and the controller adjusts a deflection amount of the laser beam from the electro-optic element based on a detection result by the positional shift detecting unit and corrects a positional shift in the sub-scanning direction of the laser beam on the scan-target surface.

20 Claims, 15 Drawing Sheets

SUB-SCAN DIRECTION

OPTICAL SCANNING DEVICE AND IMAGE FORMING APPARATUS

CROSS-REFERENCE TO RELATED APPLICATIONS

The present application claims priority from Japanese patent application numbers 2010-116176, 2010-121500, 2010-175968, and 2011-026909, filed respectively on May 20, 2010, May 27, 2010, Aug. 5, 2010, and Feb. 10, 2011, the entire contents of which are incorporated by reference herein.

BACKGROUND OF THE INVENTION

1. Field of the Invention

The present invention relates to an optical scanning device mounted on an image forming apparatus such as a digital copier or laser printer using an electrophotographic process, and also relates to an image forming apparatus including such an optical scanning device.

2. Description of the Related Art

An optical scanning device is widely known in connection with an image forming apparatus such as an optical printer, optical plotter, and digital copier, in which a light beam from a light source is deflected by an optical deflection and scanning device such as a rotary polygonal mirror, the deflected light beam is directed by a scanning and imaging system such as an fθ lens to be focused on a scanning target surface to form an optical spot thereon, and the scanning target surface is optically scanned by this optical spot.

The image forming apparatus using the optical scanning device, in general, performs image forming processes including an image writing process to write an image by an optical scan. The quality of the formed image is dependent on the scanning characteristics, and the quality of the optical scan depends on the scanning characteristics in a main scanning direction and a sub-scanning direction.

One of the scanning characteristics in the main scanning direction includes a constant velocity of the optical beam scanning. For example, if a rotary polygonal mirror is used as an optical deflection scanning means, the deflection of the optical beam is performed at equal angular velocities. Then, to achieve a constant velocity during optical scanning, a scanning imaging optical system having fθ characteristic is used. However, in light of other characteristics required for the scanning imaging optical system, a perfect fθ characteristic cannot be attained easily. Thus, in an actual optical scanning, the optical scan is never performed at constant velocity, and the constant velocity as one of scan characteristics includes a variation from an ideal constant velocity scanning.

The scan characteristic in a sub-scanning direction includes skewing of the scan line and tilting of the scan line. Ideally, however, the scan line is a movement locus of an optical spot and should be a straight line. Thus, the optical scanning device is so designed that the scan line becomes a straight line. However, in actuality, the scan line tends to skew due to errors in processing and assembly.

In addition, in a case in which an imaging mirror is used as a scanning imaging optical system and the deflection light beam is configured to have an angle between the incident direction to the imaging mirror and the reflection direction therefrom in the sub-scanning direction, in principle the skew in the scan line occurs. Even when the scanning imaging optical system is configured as a lens system, the scan line skew inevitably occurs in a so-called multi-beam scanning method in which the scan-target surface is scanned optically with a plurality of discrete optical spots in the sub-scanning direction.

The scan line tilt is a phenomenon in which the scan lines do not correctly intersect in the sub-scanning direction and is a type of scan line skew. Accordingly, unless specified otherwise, in the following description the scan line tilt is included in the scan line skew.

If the constant velocity of the optical scanning is not perfect, the formed image is distorted in the main scanning direction. The scan line skew causes the formed image to have distortion in the sub-scanning direction. In a case of a monochrome image, if such an image is written and formed by a single optical scanning device, if scan line skew and imperfection of the constant velocity (i.e., the deviation from the ideal constant velocity scanning) are regulated and kept within a certain range, the formed image does not include a distortion observable by the naked eye; however, such distortion preferably does not exist in the formed image in the first place.

Conventionally, the colors magenta, cyan, yellow, and black are used as color components, and respectively formed images are overlaid one atop another to synthesize a complete color image.

In such color image formation, there is a so-called tandem method, in which each color component image is formed on a corresponding one of multiple different photoreceptors by a corresponding one of multiple different optical scanning devices. Specifically, as color image forming devices, a plurality of photoreceptors are provided such as, for example, a photoreceptor for yellow (Y), a photoreceptor for magenta (M), a photoreceptor for cyan (C), and a photoreceptor for black (K). A laser beam is fired, based on image information of each color, by the optical scanning device corresponding to each photoreceptor, and a latent image is formed on the photoreceptor for each color and is developed by developing means to form a toner image. The toner images thus formed on respective photoreceptors are sequentially overlaid on a single transfer medium, thereby forming a desired color image.

In the aforementioned image forming method, if a degree of scan line skew and tilt of each optical scanning device is different from each other, then even though the scan line skew in each of the optical scanning device is corrected, the superimposed image formed on the single transfer medium may include a type of image abnormality called a color shift, marring the quality of the image. If this color shift occurs, the hue changes and color variation occurs, thereby failing to obtain the desired image. The reasons of the color shift vary from optical scan position errors due to the difference in the temperature of the respective optical scanning devices, to the skew and tilt of the scan line of the respective optical scanning devices.

To correct such color shifting errors, conventionally, registration error patch patterns are formed on the transfer medium for color shift detection at a time of power up or at a predetermined print cycle, and are detected by a charge couple device (CCD) to thus detect a shift amount relative to reference colors. Such CCDs are disposed at both ends of the transfer medium in the image forming area. By detecting the shift amount at two points, the scan line skew in each of the optical scanning devices is detected.

However, because color shift correction is performed mechanically, the correction cycle takes a lot of time and cannot be performed during an ordinary print cycle. In actuality, this correction cycle takes a few minutes. Therefore, if this correction cycle is performed during the print cycle, the user will have to wait until the end of the correction cycle.

Further, recently, the imaging optical system of the optical scanning device has generally come to adopt a specific surface such as an aspheric surface to improve scan characteristics. As a result, an imaging system employing resinous materials has been popularized for easier manufacturability and lower cost.

Optical characteristics of the imaging system formed of resinous materials tend to be affected by changes in temperature and humidity. Such change in the optical characteristics may change the degree of skew of the scan line and vary the constant velocity. Consequently, if for example several tens of color images need to be formed continuously, continuous operation of the image forming apparatus increases the temperature inside the apparatus, thereby changing the optical characteristics of the imaging optical system and thus also gradually changing the skew degree or the constant velocity of the writing scan line performed by each optical scanning device gradually. As a result, the color image formed initially and that formed at the end of the job can be very different from each other due to the color shifting phenomenon.

In particular, the scanning imaging lens such as an fθ lens, which is representative of scanning imaging optical systems, is in general formed such that part of the lens into which the deflected light beam is not incident in the sub-scanning direction is cut and a reed-shaped lens elongated in the main scanning direction is formed. When the scanning imaging lens is formed of a plurality of lenses, the farther the lens is positioned away from the light deflection scanning means, the larger the lens length in the main scanning direction becomes. Then, a so-called elongated lens having 10-odd to more than 20 centimeters is formed.

Such an elongated lens is formed in general using resinous materials, and therefore, if the temperature distribution inside the lens becomes uneven due to the external temperature change, the lens tends to have a bow and to be arched in the sub-scanning direction. Such a bow in the elongated lens causes the scan line skew described above. If the bow is particularly acute, the scan line skew will also be acute.

As a means to correct this scan line skew, an electro-optic element has been developed recently, in which voltage applied to a crystal of the element is controlled so that the refractive index of the crystal is changed to deflect the light. Compared to the optical scanning device used in the image forming apparatus, the light deflection amount is small, but the applied voltage can vary the refractive index at high speed. For this reason, the electro-optic element is optimal for correcting the scan line skew.

JP-3164002-B discloses a technique related to a means to correct scan line skew amount using an electro-optic element to cope with the aforementioned problems, and proposes a color image forming apparatus capable of correcting the scan line skew or the color shift amount by using the electro-optic element to deflect the transmitted optical beam by an amount corresponding to the applied voltage.

However, the invention disclosed in JP-3164002-B above could not perform high-speed shift amount detection and high-speed correction due to the time needed to detect a shift amount, the time for cleaning, and the like.

JP-3450402-B discloses a technique to correct a color shift by forming a color shift detection pattern on the transfer belt between conveyed sheets when any environmental change in the temperature or humidity occurs which may cause scan line skew. However, this method could not perform correction of the scan-line skew and tilt.

JP-3833542-B, JP-4170637-B, JP-4369658-B, JP-2006-133287-A, and JP-2006-133288-A disclose a method in which liquid crystal deflecting elements are arranged over an entire area of the scan line, and without performing pattern formation to the transfer belt to detect a shifting amount, by using effectively the light from the liquid crystal elements the scan line skew amount to be written on the photoreceptor is detected, thereby correcting the skew and tilt in the scan line and fluctuation in the constant velocity of the light beam. This method, however, may drastically increase manufacturing costs due to the use of an elongated, large liquid crystal element. In addition, the liquid crystal element has a disadvantage in that, because substances with different expansion coefficients are used in combination, spherical aberration occurs due to the effect of temperature change, and the beam characteristics on the photoreceptor tend to vary from the desired characteristics. The responsiveness of the liquid crystal element (of approximately 1 kHz) to the polygon motor frequently used as an optical scanning device having a scanning frequency of approximately 1 kHz is not good, and real time positional correction to each scan line is not possible.

SUMMARY OF THE INVENTION

This invention aims to provide a novel optical scanning device capable of correcting properly, in real time, a positional shift of a scan line including skew and tilt in the scan line and to provide an image forming apparatus including such an optical scanning device.

As an aspect of the present invention, there is provided an optical scanning device that includes a light source; a scanning unit to deflect and scan a laser beam from the light source; an imaging optical system to focus the deflected and scanned laser beam to a scan-target surface; an electro-optic element, disposed in a light path between the light source and the scan-target surface, to electrically change a refractive index of an interior of the electro-optic element; a controller to control the refractive index of the interior of the electro-optic element and adjust deflection amount of the laser beam transmitting through the interior of the electro-optic element; and a positional shift detecting unit, disposed away from the light path from the electro-optic element to the scan-target surface, to detect a positional shift of the incident laser beam from an ideal position in a sub-scanning direction. In the optical scanning device, while the laser beam is being focused on and scanned along the scan-target surface, either of the optical elements necessarily disposed between the light source and the scan-target surface splits the laser beam into one laser beam directing to the positional shift detecting unit and the other laser beam directing to the scan-target surface; and the controller adjusts a deflection amount of the laser beam from the electro-optic element based on a detection result by the positional shift detecting unit and corrects a positional shift in the sub-scanning direction of the laser beam on the scan-target surface.

These and other objects, features, and advantages of the present invention will become apparent upon consideration of the following description of the preferred embodiments of the present invention when taken in conjunction with the accompanying drawings.

DESCRIPTION OF THE PREFERRED EMBODIMENTS

Hereinafter, preferred embodiments of the optical scanning device according to the present invention will be described with reference to drawings.

First Embodiment

Figure 1:
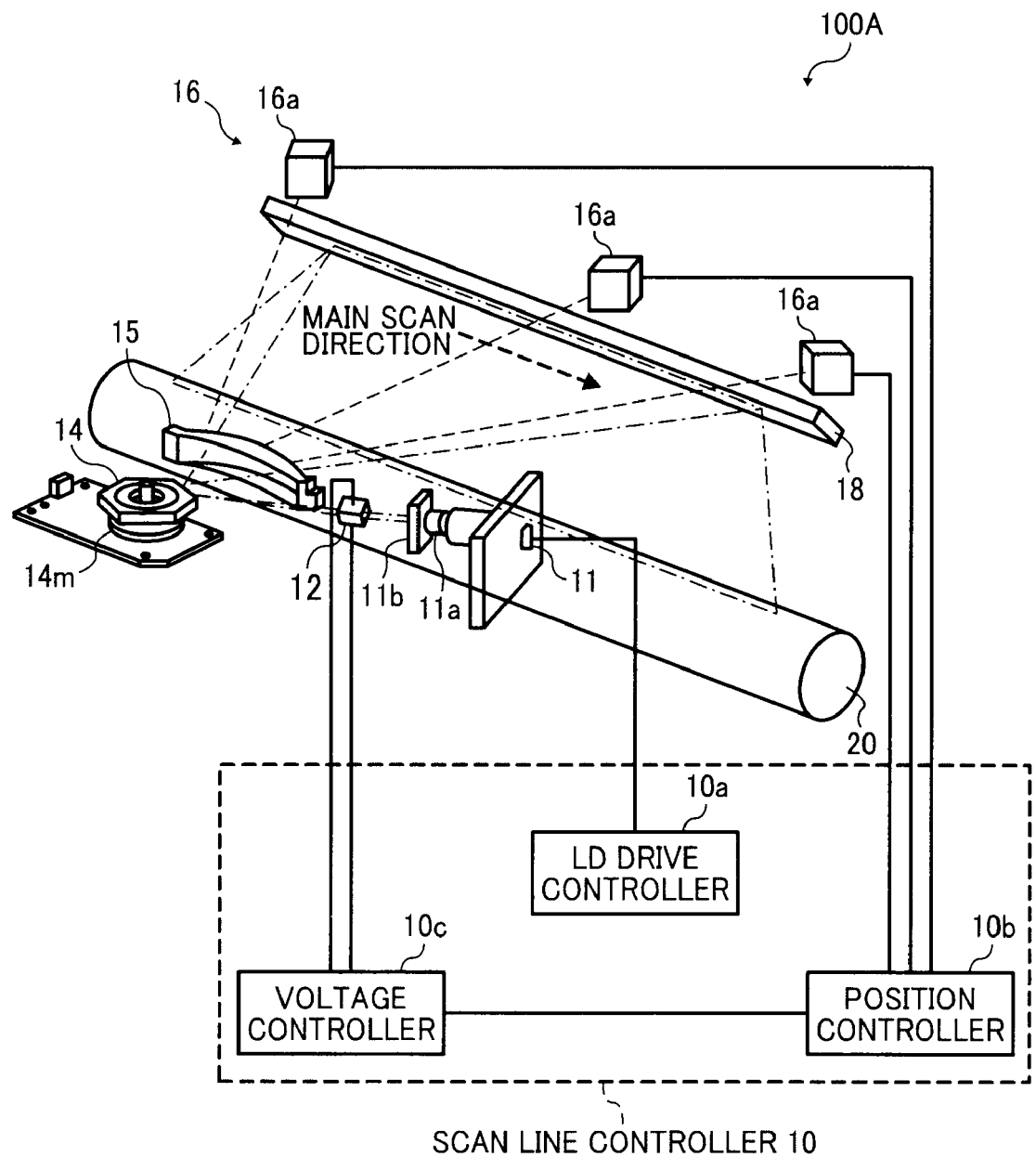
FIG. 1 shows a general configuration of an optical scanning device according to a first embodiment of the present invention.

FIG. 1 shows a schematic view of an optical scanning device according to a first embodiment of the present invention.

As illustrated in FIG. 1, an optical scanning device 100A includes a scan line controller 10, a light source 11, a coupling lens 11a, an aperture 11b, an electro-optic element 12, a polygon mirror 14, a polygon motor 14m, a scanning lens 15, a positional shift detecting unit 16, position detecting elements 16a, a reflection mirror 18, a photoreceptor drum 20, and the like.

In the optical scanning device 100A, the light source 11 being a semiconductor laser emits a divergent light beam (or a laser beam) and the coupling lens 11a transforms the diffused light beam into a type of the shape of beam suitable for the optical system. The light beam transformed by the coupling lens 11a may be a parallel light beam or a slightly divergent or slightly convergent light beam. The laser beam from the coupling lens 11a passes through the aperture 11b to be focused in the sub-scanning direction, is transmitted through the electro-optic element 12, and strikes a deflection reflection surface (or simply a reflection surface) of the polygon mirror 14, a scanning means rotated by the polygon motor 14m. Subsequently, the laser beam reflected by the deflection reflection surface is deflected constant-angularly by the rotation of the polygon mirror rotating at a constant velocity, transmits through the scanning lens 15 being an fθ lens, is reciprocated by the reflection mirror 18 to thus be focused on the scan-target surface of the photoreceptor drum or simply the photoreceptor 20. As described above, the laser beam emitted from the light source 11 is image-formed on the scan-target surface as a light spot, whereby the optical scanning of the scan-target surface is performed.

The positional shift detecting unit 16 detects a positional shift of the laser beam incident on the scan-target surface from an ideal position in the sub-scanning direction and includes the plurality of position detecting elements 16a (three are provided in FIG. 1) which are disposed away from the optical path for optical scanning between the electro-optic element 12 and the scan-target surface.

The scan line controller 10 included in the optical scanning device 100A includes an LD driver controller 10a, a position controller 10b, and a voltage controller 10c. The LD driver controller 10a controls driving of the light source 11. The position controller 10b controls a position of the scan line on the scan-target surface on the photoreceptor drum 20 based on the detection results of the positional shift detecting unit 16. The voltage controller 10c controls a voltage to be applied to the electro-optic element 12 according to control information of the position controller 10b.

Figure 2:
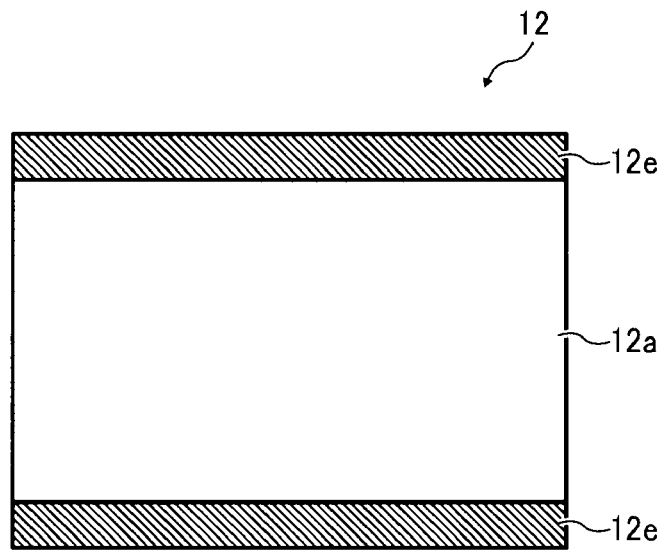
FIG. 2 is a cross-sectional view illustrating a first configuration example of an electro-optic element.

Herein, the electro-optic element 12, disposed on the light path between the light source 11 and the scan-target surface of the photoreceptor drum 20, is capable of changing its internal refractive index electrically. For example, the electro-optic element 12 is, as illustrated in FIG. 2, configured such that an electro-optic crystal is sandwiched by electrodes 12e.

The electro-optic crystal 12a in the electro-optic element 12 is preferably formed of such a material having a large Pockels coefficient. In particular, a electro-optic crystal including Kalium (K), Tantalum (T), Niobium (Nb), and Oxygen (O), one including Lithium (Li) and Niobium (Nb), or one including Lithium (Li) and Tantalum (T) is preferred.

In addition, it is preferred that a prism-shaped polarization domain inversion area be formed in the electro-optic crystal 12a. According to this configuration, the deflection effect of the transmitted light in the electro-optic element 12 is improved, and the voltage to be applied to the electro-optic element 12 is reduced, thereby reducing the energy consumption. See, for details of the configuration of the prism-shaped polarization domain inversion area, JP-H09-501245-A.

Figure 3:
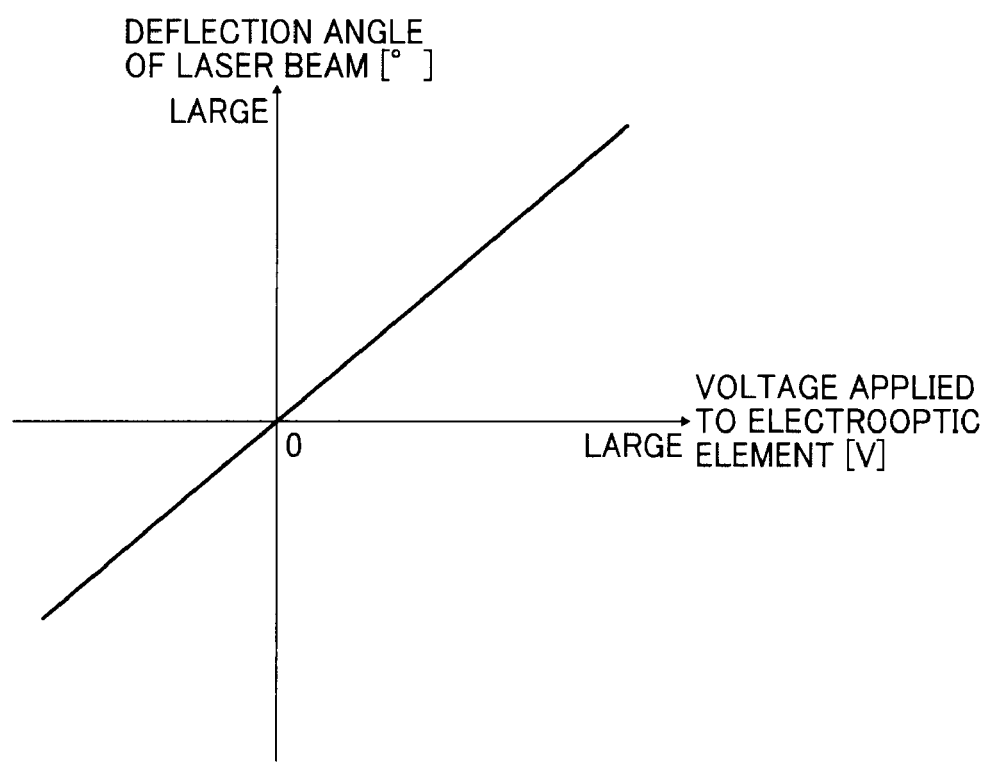
FIG. 3 is a graph showing a relation between the voltage applied to the electro-optic element and a deflection angle of the laser beam.

In the electro-optic element 12, the voltage applied to the electrode 12e and the refractive index of the electro-optic crystal 12a have a proportional relation to each other, and as illustrated in FIG. 3, change in the applied voltage to the electrode 12e is used to adjust the refractive index of the electro-optic crystal 12a, thereby controlling the deflection angle of the laser beam, which is transmitted through the electro-optic crystal 12a, to be an arbitrary deflection amount.

In addition, the electrode 12e is connected to the voltage controller 10c, which adjusts a voltage to be applied to the electrode 12e.

Figure 4:
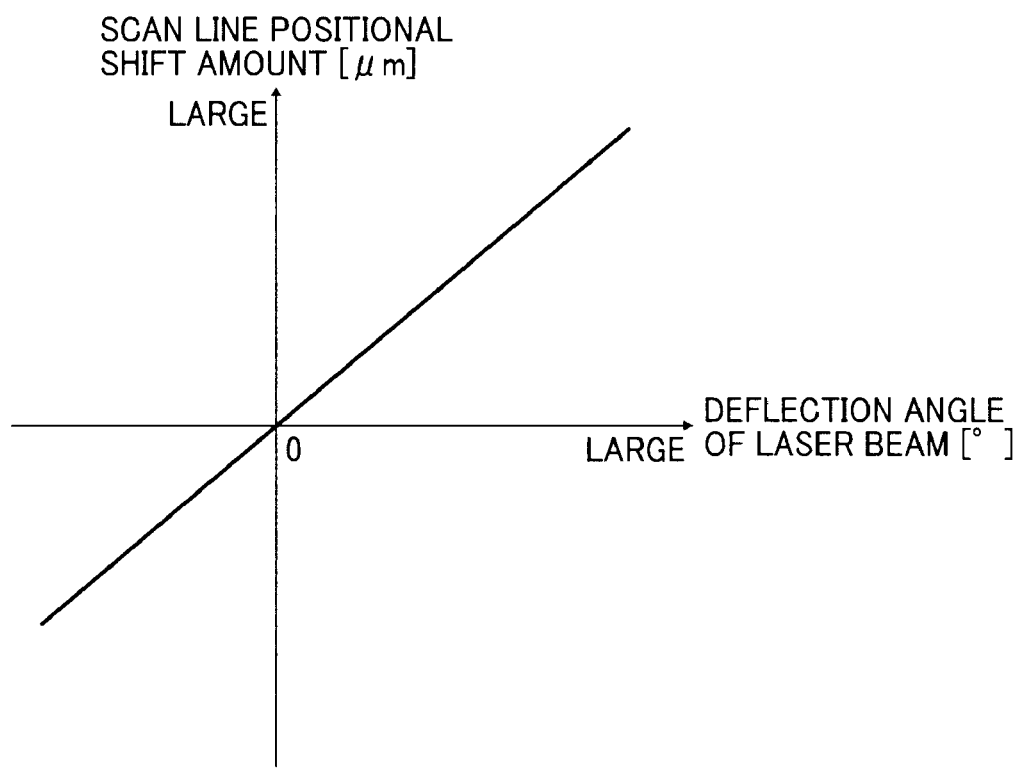
FIG. 4 is a graph showing a relation between the scan-line positional shift amount and deflection angle of the laser beam.

In the optical scanning device 100A, layout positions of the light source 11, coupling lens 11a, cylindrical lens (not shown), polygon mirror 14, scanning lens 15, reflection mirror 18, and photoreceptor drum 20 are fixed. Then, changes in the deflection angle of the laser beam in the electro-optic element 12 causes a position of the optical spot on the scan-target surface to change. Specifically, as illustrated in FIG. 4, it is possible to move and adjust the position of the optical spot on the scan-target surface, that is, a scan line on the photoreceptor drum 20, by changing the voltage to be applied to the electro-optic element 12.

If the voltage is applied to the electrode 12e, it is preferred that an electric field perpendicular to a traveling direction of the interior-transmitting laser beam and corresponding to a main scanning direction be formed in the electro-optic crystal 12a. According to this, the incident beam can be deflected in the sub-scanning direction effectively. The optical deflection by the electro-optic crystal 12a is disclosed in JP-3164002 and is well known. Therefore, its detailed description will be omitted.

In addition, it is preferred that the electro-optic element 12 be so disposed in the optical scanning device 100A that its optical deflection efficiency in the sub-scanning direction of the optical scanning device 100A is maximized. Accordingly, the electro-optic element 12 can deflect the laser beam effectively with respect to the applied voltage.

Figure 5:
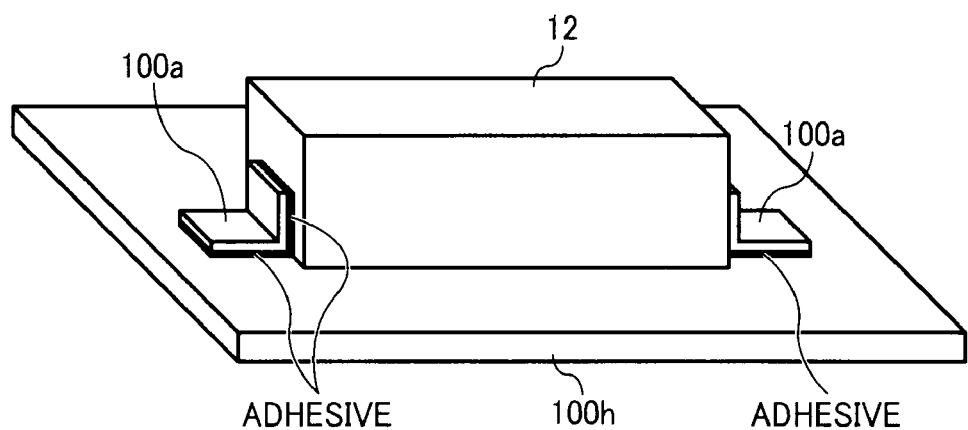
FIG. 5 is a diagram illustrating a fixed status of the electro-optic element by indirect adhesion method.

In addition, by accurately adjusting and fixing the position of the electro-optic element 12, the deflection efficiency increases correspondingly, and therefore, indirect adhesion is preferred whereby the position of the electro-optic element 12 is first adjusted in a housing of the optical scanning device 100A and then fixed. Indirect adhesion indicates a method in which, as illustrated in FIG. 5, the electro-optic element 12 is fixed by adhesion to the housing 100h via fixing members 100a. Specifically, the electro-optic element 12 is placed at a predetermined position on the housing 100h of the optical scanning device 100A; the electro-optic element 12 is, at both sides, sandwiched by L-shaped fixing members 100a; and an adhesive is applied to parts between each fixing member 100a and the housing 100h and the electro-optic element 12, thereby fixing the electro-optic element 12 on the housing 100h. In this case, ultraviolet cure adhesive can be used as an adhesive. The ultraviolet cure adhesive can be applied thinly to the surface, and can reduce a positional shift of the electro-optic element 12 due to the change in volume of the cured adhesive, thus enabling the electro-optic element 12 to be fixed precisely. This indirect adhesion method is also applicable to second and third embodiments to be described later.

The electro-optic element 12 as described above has no mechanically movable parts to deflect the light beam, and its responsiveness is related only to the applied voltage. Thus, the electro-optic element 12 may perform sufficiently high-speed operation compared to the polygon motor or the liquid crystal element. In addition, because the electro-optic crystal 12a is formed with a prism-shaped polarization domain inversion area, substantially the same efficiency as that of the polygon motor with respect to the deflection angle is obtained. For example, because the scanning frequency of the polygon mirror 14 is 1 kHz and the response speed of the electro-optic element 12 is 100 kHz being a high speed, positional shift detection and position correction of the scan line is enabled while writing the scan line, which will be described later. Specifically, the electro-optic element 12 includes a distribution function, in which the laser beam from the light source 11 is deflected by changing the refractive index of the interior of the electro-optic element 12 and the thus deflected laser beam is caused to be incident to either the positional shift detecting unit 16 (that is, the position detecting element 16a) or the scan-target surface (that is, the photoreceptor drum 20).

Meanwhile, the response speed of the liquid crystal is approximately 1 kHz, and therefore cannot perform such a real-time positional shift correction.

In addition, the electro-optic element 12 has an advantage that, because the element size is so small as to be one hundredth of the polygon motor, its layout in the optical scanning device 100A is easier.

In FIG. 1, although the electro-optic element 12 is shown disposed between the light source 11 and the polygon mirror 14, the disposition of the electro-optic element 12 is not limited thereto. Thus, the electro-optic element 12 can be disposed at an arbitrary position as long as it is placed between the light source 11 and the photoreceptor drum 20. For example, In a case where the electro-optic element 12 is placed before the scanning unit such as the polygon mirror 14 which is nearer to the light source side, the laser beam is not scanned and the electro-optic element 12 may only have a beam diameter larger than that of the laser beam, and therefore is effective in terms of cost. In addition, when the electro-optic element 12 is placed after the coupling lens 11a, a substantially parallel light beam is incident to the electro-optic element 12, which is advantageous because degradation of the beam shape can be prevented. On the other hand, when the electro-optic element 12 is located after the scanning unit such as the polygon mirror 14 and on the side of the photoreceptor drum 20, and, in particular, is placed outside the housing of the optical scanning device 100A, it is advantageous in terms of the precision of positional shift correction because the correction of the scan line position including changes over time of those parts located before the photoreceptor drum 20 such as the reflection mirror 18 and other optical system, and optical scanning device 100A, is enabled.

In the present invention, the position of the electro-optic element 12 can be determined considering the balance of the above parts and components.

In addition, the optical scanning device 100A according to the present invention is capable of detecting a positional shift from an ideal position of the incident laser beam in the sub-scanning direction by changing the deflection angle of the laser beam in the electro-optic element 12 by a predetermined amount and by making the laser beam incident on the position detecting elements 16a each serving as the positional shift detecting unit 16.

The positional shift detecting unit 16 is configured such that the plurality of position detecting elements 16a are disposed parallel in the direction corresponding to the main scanning direction and disposed at positions within the main scan section on the photoreceptor drum 20. The allocated positions of the position detecting elements 16a are outside the optical path for the optical scanning starting from the electro-optic element 12 to the scan-target surface, and more specifically, are positions away from the optical path of the laser beam directing to the photoreceptor drum 20 in the sub-scanning direction, and the positions into which a laser beam deflected by the electro-optic element 12 can be incident.

Accordingly, the electro-optic element 12 adjusts a deflection angle of the laser beam with a predetermined timing so that the laser beam strikes the position detecting elements 16a, whereby the positional shift of the scan line formed by the optical spot incident to the photoreceptor drum 20 and forming an image can be detected at an image height at which the position detecting elements 16a are disposed.

Figure 6:
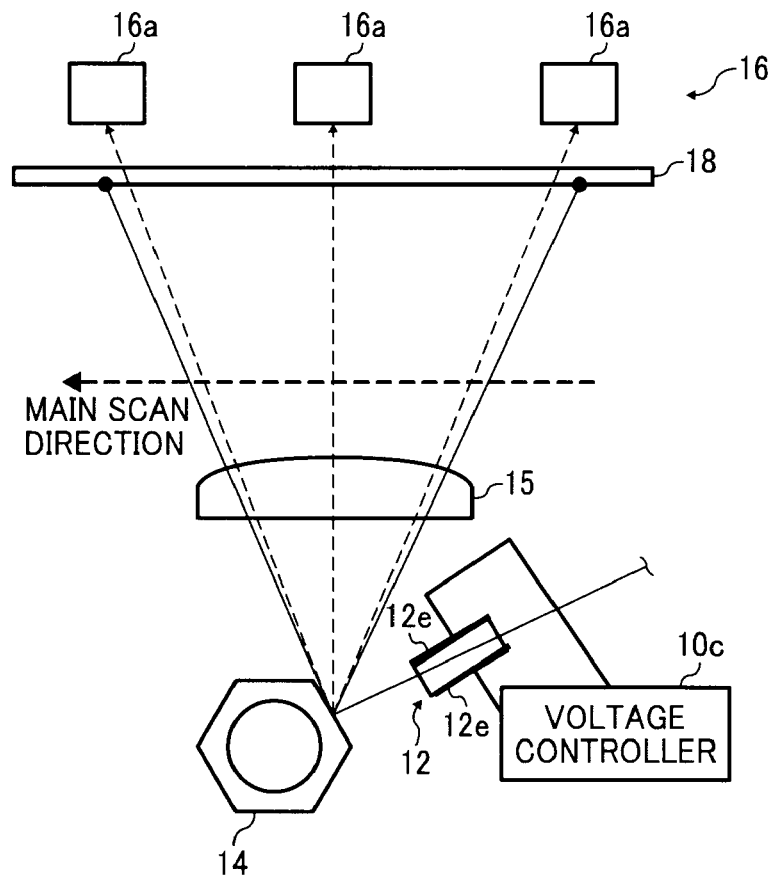
FIG. 6 is a plan view of the optical scanning device seen from above illustrating a first layout example of the position detecting elements.
Figure 7:
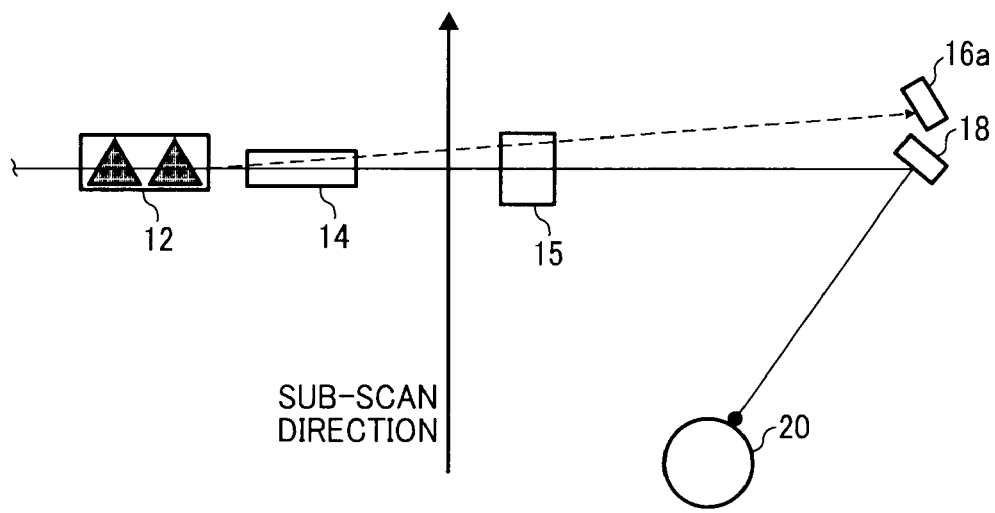
FIG. 7 is a side view of the optical scanning device seen from a side illustrating the first layout example of the position detecting elements.

FIGS. 1, 6, and 7 show a first example of the position detecting elements 16a. Specifically, FIG. 6 is a view of the optical scanning device 100A seen from above, and FIG. 7 shows a view of the optical scanning device 100A seen from a side.

As illustrated in FIGS. 1, 6, and 7, the position detecting elements 16a are disposed inside the optical housing of the optical scanning device 100A, and three position detecting elements 16a are disposed in the vicinity of and shifted from the reflection mirror 18 by a predetermined amount in the direction corresponding to the sub-scanning direction and parallel to the main scanning direction.

Figure 8:
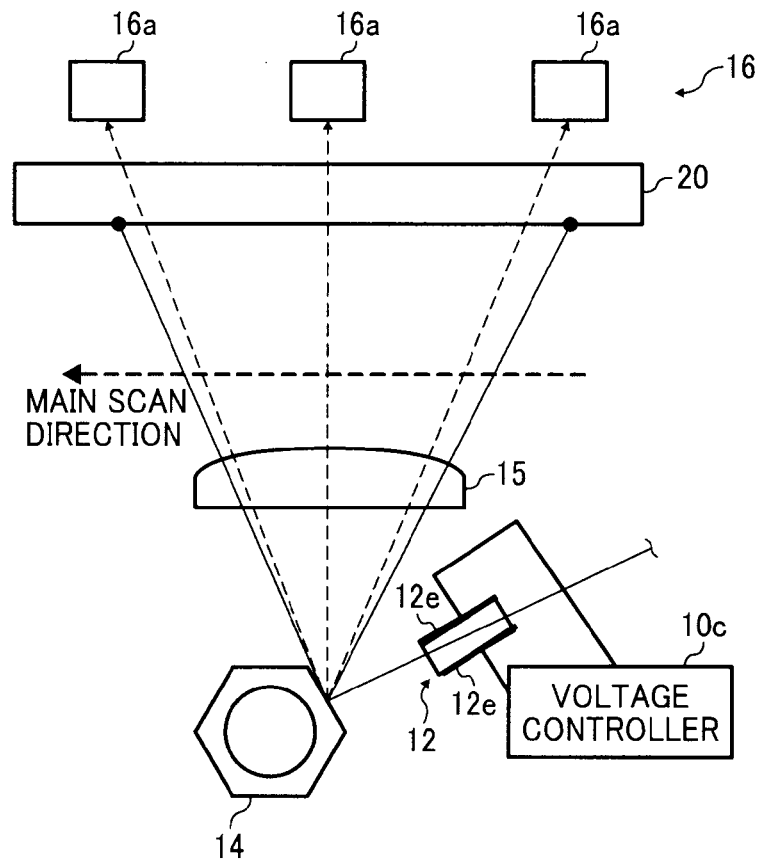
FIG. 8 is a plan view of the optical scanning device illustrating a second layout example of the position detecting elements.
Figure 9:
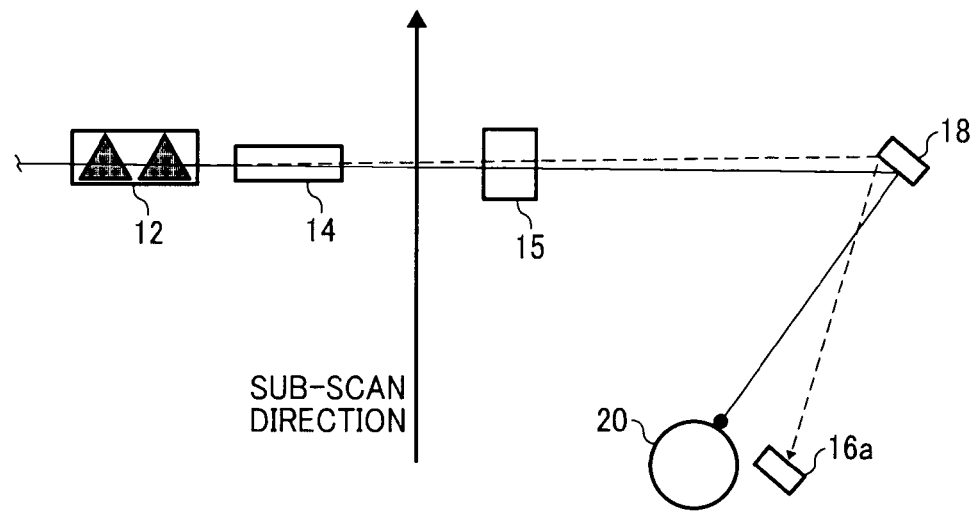
FIG. 9 is a side view of the optical scanning device illustrating the second layout example of the position detecting elements.

Further, FIGS. 8 and 9 show a second example of the position detecting elements 16a. Specifically, FIG. 8 is a view of the optical scanning device 100A seen from above, and FIG. 9 shows a view of the optical scanning device 100A seen from a side.

As illustrated in FIGS. 8 and 9, the position detecting elements 16a are disposed outside the optical housing of the optical scanning device 100A, and three position detecting elements 16a are disposed in the vicinity of and shifted from the reflection mirror 18 by a predetermined amount in the direction corresponding to the sub-scanning direction and parallel along the main scanning direction.

The position detecting elements 16a each are optical sensors that output, as a detection result, differences in positions between an ideal position to which the originally-designed laser beam of the position detecting element 16a should be incident and an actual position to which the laser beams actually is incident.

Thus, according to the positioning of the these position detecting elements 16a, the registration shift error of the scan line in the sub-scanning direction can be detected by using at least one position detecting element 16a, the scan line skew can be detected by using at least two position detecting elements 16a, and the scan line tilt can be detected by using at least three position detecting elements 16a. Thus, by disposing at least three position detecting elements 16a, the registration shift error, skew and tilt can all be detected from a desired scan line.

The position detecting elements 16a can be disposed at positions as described in the first and second examples or at a position away from the light path of the laser beam to the scan-target surface or the photoreceptor drum 20 in a direction corresponding to the sub-scanning direction, and within a position at which the laser beam deflected by the electro-optic element 12 can be incident. However, the position detecting elements 16a are preferably disposed at positions as near to the photoreceptor drum 20 as possible, so that a position correction can be performed with a higher precision.

It should be noted that, in the present embodiment, the number of the position detecting elements 16a is three. However, the number of position detecting elements is not limited thereto, and one or more elements elongated in the main scanning direction can be used. Also, by expanding the area of the scan line to be detected by the position detecting elements 16a, the positional shift of the scan line can be detected with a higher precision.

As illustrated in FIG. 1, the position controller 10b disposed in the scan line controller 10 receives detection results of each of the position detecting elements 16a of the positional shift detecting unit 16, and calculates to obtain a positional shift correction amount of the scan line on the scan-target surface of the photoreceptor drum 20 based on the detection results.

The voltage controller 10c is connected to the position controller 10b, and changes the voltage to be applied to the electro-optic element 12 based on the positional shift correction amount in the sub-scanning direction of the scan line or the correction amount for detection, input from the position controller 10b.

As described above, because the present invention employs the electro-optic element 12 operating at a high speed, time for correcting the position of the scan line in the sub-scanning direction includes only an electrical time taken for calculating the position in the sub-scanning direction of an optical spot incident to the photoreceptor drum 10 based on the actually obtained scan position data (positional shift amount) obtained by the positional shift detecting unit 16, thereby realizing positional shift correction in real time. In addition, in the scan line on the scan-target surface, the position in the sub-scanning direction can be corrected by each position in the main scanning direction, that is, by each dot.

The scan line controller 10 in the optical scanning device 100A of the present invention controls the refractive index within the electro-optic element 12, while the laser beams being focused onto the scan-target surface of the photoreceptor drum 2 and scanned thereon, to deflect the laser beam from the electro-optic element 12 by a predetermined deflection amount. The scan line controller 10 then performs the scan line positional shift detection control in which the deflected laser beam is made incident to the position detecting element 16a of the positional shift detecting unit 16; and the scan line correction control in which, based on the detection result of the positional shift detecting unit 16, the deflection amount of the laser beam from the electro-optic element 12 is adjusted, and the positional shift of the laser beam in the sub-scanning direction on the scan-target surface is corrected. In the above operation, it is preferred that the scan line controller 10 alternately perform the scan line positional shift detection control and the scan line correction control while the laser beams are being focused onto the scan-target surface and the surface scanned.

Figure 10:
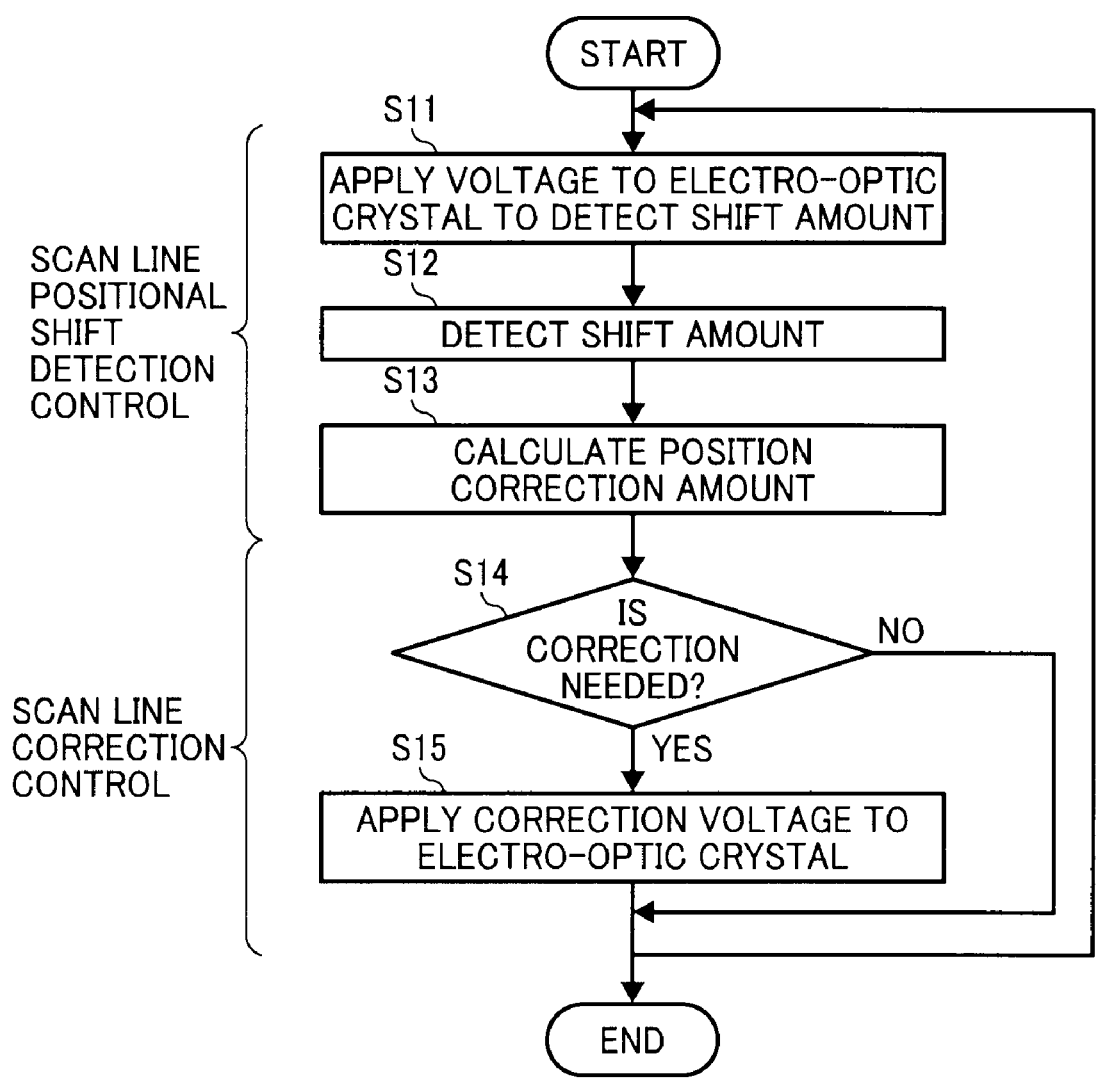
FIG. 10 is a flowchart illustrating scan-line positional shift detection control and scan-line correction control in the optical scanning device in FIG. 1.

FIG. 10 is a flowchart showing steps in a process of scan line positional shift detection control and scan line correction control performed while the laser beams are being focused and scanned on the scan-target surface of the photoreceptor drum 20.

(S11) The voltage controller 10c applies a voltage based on the correction amount for detection from the position controller 10b or a predetermined voltage to the electro-optic element 12. Accordingly, the laser beam is deflected by a predetermined angle in the electro-optic element 12 and is incident to the position detecting element 16a, a target of the positional shift detecting unit 16.

(S12) The target position detecting element 16a detects a positional shift amount which is a difference between the incident position of the laser beam and an ideal position designed optically and outputs the amount to the position controller 10b.

(S13) The position controller 10b calculates a positional shift correction amount of the scan line in the scan-target surface of the photoreceptor drum 20 based on the detection result of the target position detecting element 16a. Processing up to this step constitutes the scan-line positional shift detection control.

(S14) The scan line controller 10 determines whether the positional shift correction is necessary or not based on the calculation result (that is, a positional shift correction amount) of the position controller 10b. For example, it is configured such that the positional shift correction control of the scan line may be performed upon the positional shift amount exceeding a predetermined threshold value. If the positional shift correction of the scan line is not necessary (No in step S14), the process returns to step S11 or a series of processing is terminated.

(S15) If it is determined that the positional shift correction of the scan line is necessary (Yes in step S14), the voltage controller 10c applies voltage of which amount is determined based on the calculation result (i.e., the positional shift correction amount) of the position controller 10b, to the electro-optic element 12, whereby the deflection angle of the laser beam in the electro-optic element 12 is adjusted and the positional shift in the sub-scanning direction of the scan line on the scan-target surface of the photoreceptor drum 20 is corrected. Process up to this step constitutes the scan-line correction control.

The scan line controller 10 performs the scan line positional shift detection control and the scan line correction control with a predetermined timing based on the scanning frequency of the scan unit (the polygon mirror 14) and the detection position, that is, the disposed position of the position detecting element 16a, in the direction corresponding to the main scanning direction in the positional shift detecting unit 16. For example, in the optical scanning device 100A as illustrated in FIG. 1, the positional shift correction is performed to the scan line in a segment from a first position detecting element to a second position detecting element 16a based on the positional shift correction amount calculated from the detection result by the first position detecting element 16a into which the laser beam is first incident. Then, the positional shift correction is performed to the scan line in a segment from the second position detecting element 16a to a third position detecting element 16a based on the positional shift correction amount calculated from the detection result by the second position detecting element 16a, and further, the positional shift correction is performed to the scan line in a segment from the third position detecting element 16a to the first position detecting element 16a based on the positional shift correction amount calculated from the detection result by the third position detecting element 16a. Accordingly, there is no standby time for the positional shift correction, and an optimal scan line position-corrected in real time can be obtained.

Second Embodiment

Figure 11:
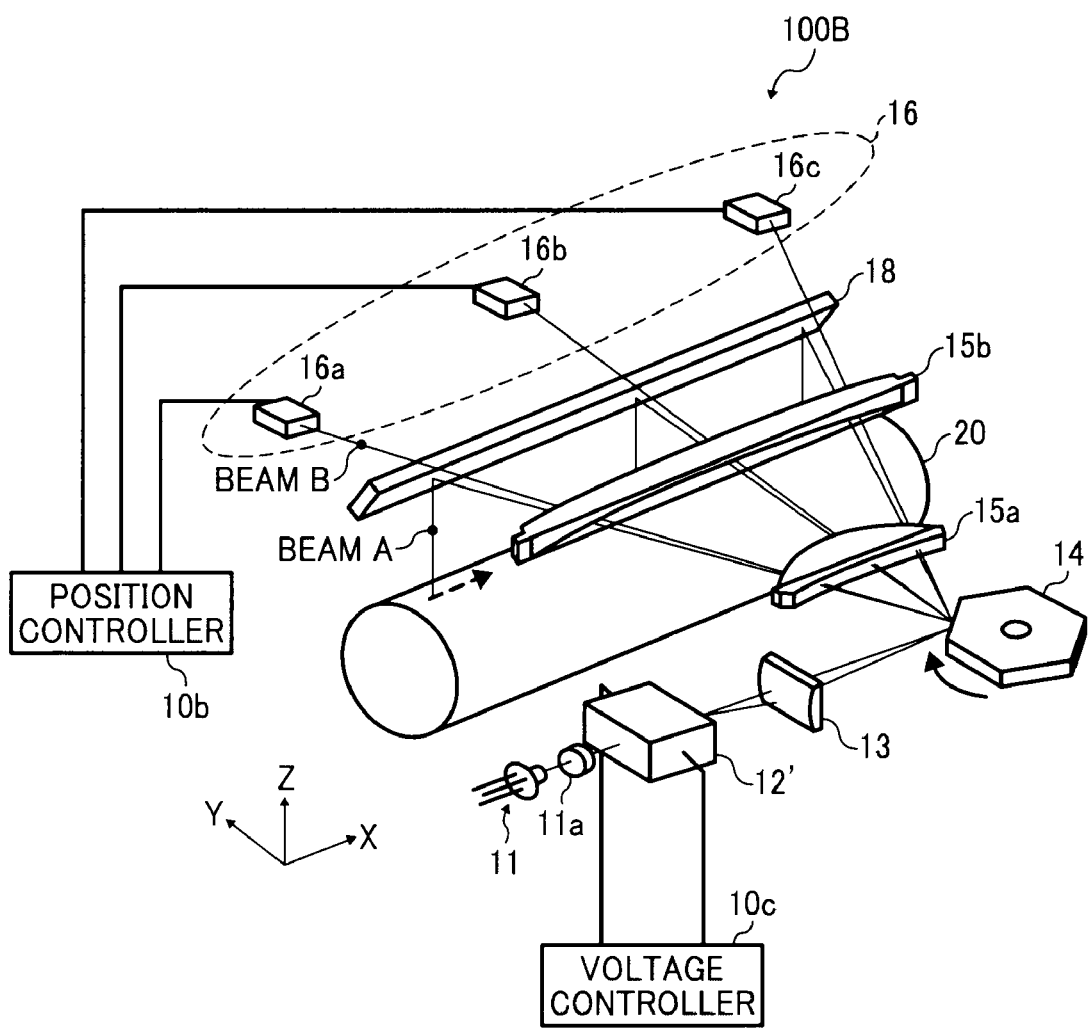
FIG. 11 shows a general configuration of an optical scanning device according to a second embodiment of the present invention.

FIG. 11 is a schematic view of an optical scanning device 100B according to a second embodiment of the present invention.

As illustrated in FIG. 11, the optical scanning device 100B includes the light source 11, the coupling lens 11a, an electro-optic element 12', the cylindrical lens 13, the polygon mirror 14 as a scanning means to deflect the light beam in the main scanning direction, the first scanning lens 15a disposed at a side of deflector and being an fθ lens of the imaging optical system, the second scanning lens 15b disposed at a side of imaging surface, position detecting elements 16a, 16b, and 16c, the reflection mirror 18 being a reciprocating mirror, the position controller 10b to calculate the positional shift amount in the scan line from the position detecting elements 16a, 16b, and 16c, the voltage controller 10c to control the voltage to be applied to the electro-optic element 12', and an optical housing in which the above parts and components are mounted at respective predetermined positions.

In the present embodiment, in the X-Y-Z three dimensional Cartesian coordinates, explanation will be given by setting the direction along the optic axis of the cylindrical lens 13 to be the X-axis direction, and the direction parallel to the rotation axis of the polygon mirror 14 to be the Z-axis direction. In addition, for the simplifying purpose, the direction corresponding to the main scanning direction is the main scanning direction, and the direction corresponding to the sub-scanning direction is the sub-scanning direction.

As illustrated in FIG. 11, in the optical scanning device 100A, a divergent light beam (or laser beam) emitted from the light source 11 is transformed by the coupling lens 11a into a type of the shape of beam suitable for the optical system. The light beam transformed by the coupling lens 11a may be a parallel light beam or a slightly divergent or slightly convergent light beam. The laser beam from the coupling lens 11a passes through the electro-optic element 12' to be focused in the sub-scanning direction, and strikes a deflection reflection surface (or simply a reflection surface) of the polygon mirror 14. Subsequently, the laser beam reflected by the deflection reflection surface is deflected constant-angularly by the rotation of the polygon mirror 14 rotating at a constant velocity, transmits through the scanning lens 15a and 15b, and is reciprocated by the reflection mirror 18 to thus be focused on the scan-target surface of the photoreceptor drum or simply the photoreceptor 20. As described above, the laser beam emitted from the light source 11 is image-formed on the scan-target surface as a light spot, whereby the optical scanning of the scan-target surface is performed.

The positional shift detecting unit 16 detects a positional shift of the laser beam incident on the scan-target surface from an ideal position in the sub-scanning direction and includes a plurality of position detecting elements 16a, 16b, and 16c (three are provided in FIG. 1) which are disposed away from the optical path for optical scanning from the electro-optic element 12' toward the scan-target surface.

The optical scanning device 100B includes the position controller 10b which outputs control information to correct positional shift of the scan line on the scan-target surface of the photoreceptor drum 20 based on the detection result of the positional shift detecting unit 16 and the voltage controller 10c which controls the voltage to be applied to the electro-optic element 12' based on the control information of the position controller 10b. The optical scanning device 100B further includes a scan line controller, not shown, to control a double refraction index within the electro-optic element 12' and adjust the deflection amount of the laser beam which transmits through the interior thereof. The scan line controller includes an LD drive controller which controls driving of the light source 11.

Herein, the light source 11 is a semiconductor laser device to emit a laser beam. The laser beam emitted from the light source 11 is preferably linear polarized light.

Figure 12:
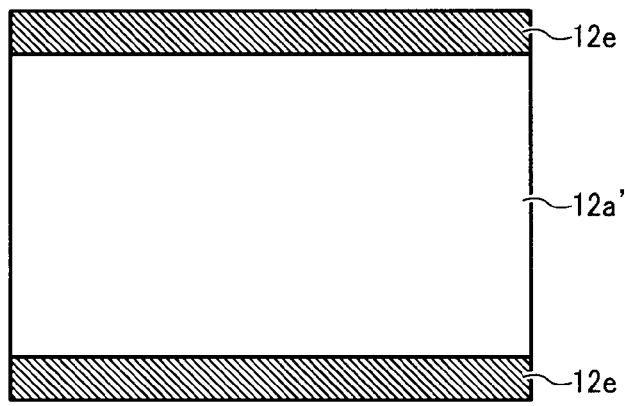
FIG. 12 is a cross-sectional view illustrating a second configuration example of an electro-optic element.

The electro-optic element 12' is disposed on the light path between the light source 11 and the scan-target surface of the photoreceptor drum 20, and is an optical element capable of changing the double refractive index within the element 12' electrically. As illustrated in FIG. 12, the electro-optic element 12' is formed such that an electro-optic crystal 12a' is sandwiched by the electrodes 12e.

More specifically, the electro-optic element 12' includes an optical anisotropy due to the characteristic of the electro-optic crystal 12a' and can electrically change the double refractive index of an interior thereof. Specifically, the electro-optic element 127 includes an anisotropy due to the direction of crystal axis of the electro-optic crystal 12a', and the deflection angle changes proportional to the change in the applied voltage according to the relation between the deflection direction of the incident light beam and the crystal axis direction of the electro-optic crystal 12a'.

Figure 13:
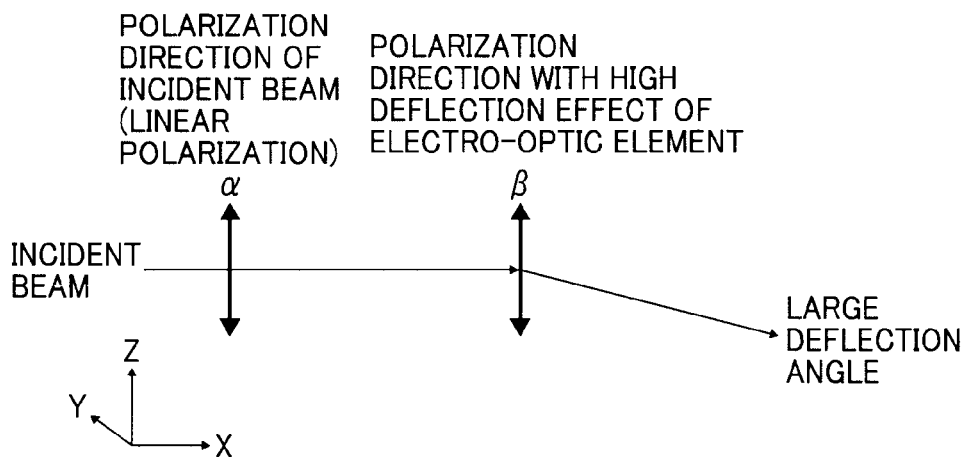
FIG. 13 is a schematic diagram illustrating a deflection state of an incident light beam in the electro-optic element in FIG. 12 when the polarization direction α of the incident beam and the polarization direction β of the electro-optic element 12' with a high deflection characteristic are parallel to each other.
Figure 14:
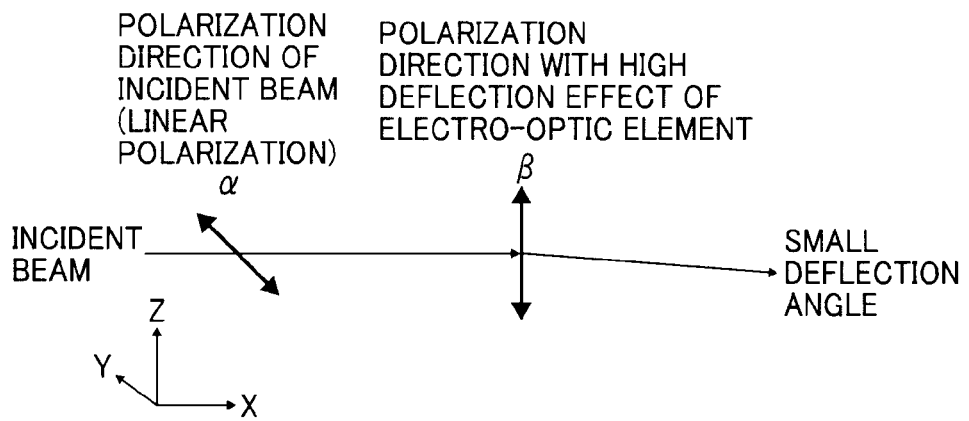
FIG. 14 is a schematic diagram illustrating a deflection state of an incident light beam in the electro-optic element in FIG. 12 when the polarization direction α of the incident beam and the polarization direction β of the electro-optic element 12' with a high deflection characteristic are perpendicular to each other.

Here, assuming that the polarization direction of the light beam incident to the electro-optic element 12' is set to α, and the polarization direction of the electro-optic element 12' with a high deflection characteristic is set to β, when the polarization direction α of the incident beam and the polarization direction β of the electro-optic element 12' with a high deflection characteristic are parallel to each other, the deflection angle of the transmitted light beam becomes the highest as illustrated in FIG. 13. By contrast, as illustrated in FIG. 14, when the polarization direction α of the incident beam and the polarization direction β of the electro-optic element 12' with a high deflection characteristic are orthogonal to each other, the deflection angle of the transmitted light beam becomes small. Specifically, the deflection angle obtained by the polarization direction of the incident beam with respect to a certain applied voltage is different.

In the present invention, making use of the characteristic of the electro-optic element 12', the polarization direction α of the incident beam into the electro-optic element 12' has both the parallel state and the orthogonal state with respect to the polarization direction β of the electro-optic element 12' with a high deflection characteristic, whereby the deflection angle is varied depending on the polarization direction so that the incident beam is split into two laser beams of a light beam A and a light beam B, and the beam A and the beam B are always emitted at the same time. Specifically, the electro-optic element 12' includes the optical anisotropy, and thus, the laser beam from the light source 11 is split into the laser beam (the light beam A) incident into the scan-target surface (the photoreceptor drum 20) and the laser beam (the light beam B) incident into the positional shift detecting unit 16 embodied by the position detecting elements 16a, 16b, and 16c.

Figure 15:
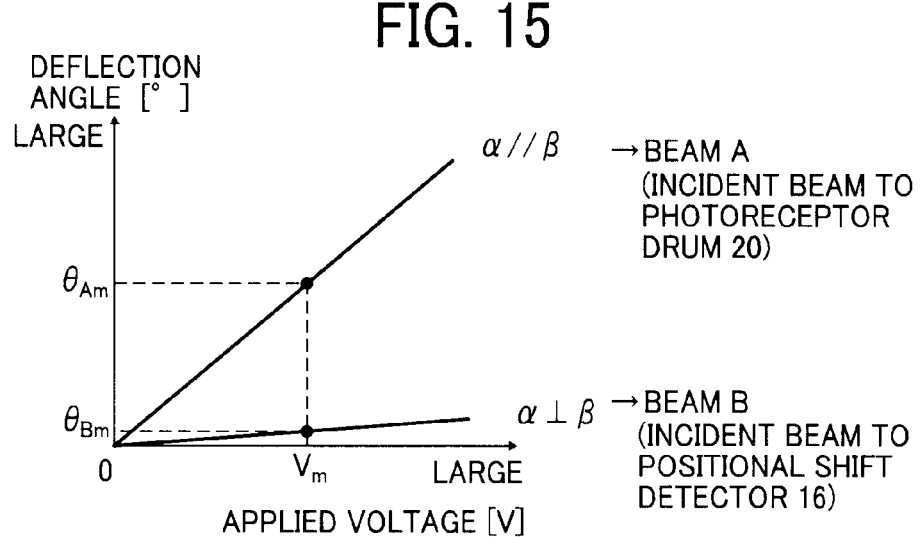
FIG. 15 shows a relation between the deflection angle of the light beam A and the light beam B after having been transmitted through the electro-optic element 12' and the applied voltage.

FIG. 15 shows a relation between the deflection angle of the light beam A and the light beam B after having transmitted through the electro-optic element 12' and the applied voltage. The light beam A is the light incident to the photoreceptor drum 20 and has a relation in which the polarization direction α of the incident beam and the polarization direction β of the electro-optic element 12' with a high deflection characteristic are parallel to each other (α//β) as illustrated in FIG. 13, and the light B is the light incident to the positional shift detecting unit 16 and has a relation in which the polarization direction α and the polarization direction β are orthogonal to each other (α⊥β) as illustrated in FIG. 14.

Among the light beams obtained this time, the light beam (α//β) with a large deflection angle for the applied voltage is directed to the photoreceptor drum 20 (the light beam A) and the light beam (α⊥β) with a small deflection angle related to the applied voltage is directed to the positional shift detecting unit 16 (the light beam B).

In FIG. 15, assuming that the applied voltage to the electro-optic element 12' is Vm in the initial state, when the applied voltage is increased from the voltage Vm, the light beam A with a large change rate of the deflection angle related to the applied voltage shows a large change in the imaging position on the photoreceptor drum 20. However, the light beam B with a small change rate of the deflection angle related to the applied voltage rarely shows a change in the position on the position detecting elements 16a, 16b, and 16c. Thus, while detecting the beam position by the position detecting elements 16a, 16b, and 16c, the beam position on the photoreceptor drum 20 can be corrected by changing the applied voltage to the electro-optic element 12'.

In the optical scanning device 100B according to the present invention, the deflection angle of the light beam incident to the electro-optic element 12' is efficiently adjusted relative to the crystal axis thereof. Specifically, the polarization direction of the incident beam of the electro-optic element 12' to the polarization direction β with a high deflection efficiency is adjusted by rotating the light source 11 about the optic axis of the electro-optic element 12' so that the polarization direction of the laser beam to be incident to the electro-optic element 12' is adjusted to cope with the optic anisotropy of the electro-optic element 12'.

Figure 16:
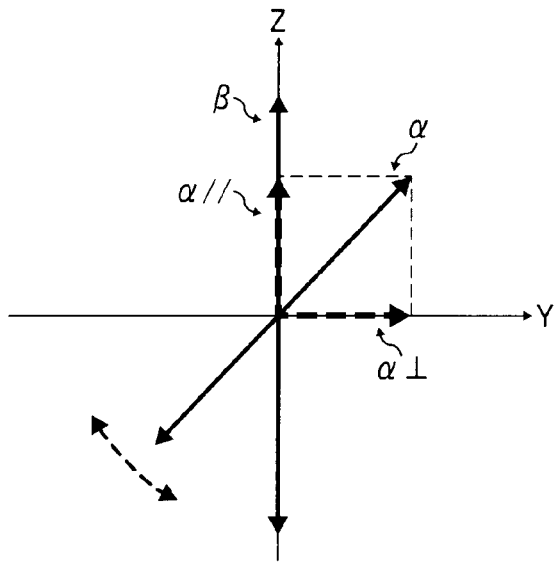
FIG. 16 is a schematic diagram illustrating a relation between the polarization direction α of the incident beam to the electro-optic element in the optical scanning device of FIG. 11 and the polarization direction β of the electro-optic element with high deflection efficiency.

FIG. 16 is a schematic diagram illustrating a relation between the polarization direction α of the incident beam to the electro-optic element 12' in the optical scanning device 100B and the polarization direction β of the electro-optic element 12' with high deflection efficiency. Here, the magnitude of the incident beam in the polarization direction α is represented by a length of the electric field vector, and the incident beam includes an incident beam component α// parallel to the polarization direction β with high deflection efficiency of the electro-optic element 12' and an incident light component α⊥ perpendicular to the polarization direction β with high deflection efficiency of the electro-optic element 12'. In the present embodiment of the invention, by adjusting to rotate the angle of the incident beam a being linear polarized light, the ratio between the incident beam component α// parallel to the polarization direction β with high deflection efficiency of the electro-optic element 12' and the incident light component α⊥ perpendicular to the polarization direction β with high deflection efficiency of the electro-optic element 12' can be adjusted. In FIG. 16, α// denotes the incident beam component to be α//β in FIG. 15 and corresponds to the light beam A to be directed to the photoreceptor drum 20. In addition, α⊥ denotes the incident beam component to be α⊥β in FIG. 15 and corresponds to the light beam B to be directed to the position detecting elements 16a, 16b, and 16c. Specifically, by adjusting the rotation angle of the light source 11, the ratio (or the light amount) between the light beam A and the light beam B can be adjusted, thereby obtaining a desired light amount on the scan-target surface and the positional shift detecting unit 16.

The electro-optic crystal 12a' in the electro-optic element 12 is preferably formed of such a material having a large Pockels coefficient. In particular, the electro-optic crystal including Kalium (K), Tantalum (T), Niobium (Nb), and Oxygen (O), one including Lithium (Li) and Niobium (Nb), or one including Lithium (Li) and Tantalum (T) is preferred.

In addition, it is preferred that a prism-shaped polarization domain inversion area be formed in the electro-optic crystal 12a'. According to this configuration, the deflection effect of the transmitted light in the electro-optic element 12' is improved, and the voltage to be applied to the electro-optic element 12' is reduced, thereby reducing the energy consumption. See, for details of the configuration of the prism-shaped polarization domain inversion area, JP-H09-501245-A.

In the electro-optic element 12', the voltage applied to the electrode 12e and the refractive index of the electro-optic crystal 12a' have a proportional relation to each other, and change in the applied voltage to the electrode 12e is used to adjust the refractive index of the electro-optic crystal 12a', thereby controlling the deflection angle of the laser beam, which transmits through an interior of the electro-optic crystal 12a, to be an arbitrary deflection amount.

In addition, the electrode 12e is connected to the voltage controller 10c, which adjusts a voltage to be applied to the electrode 12e.

Figure 17:
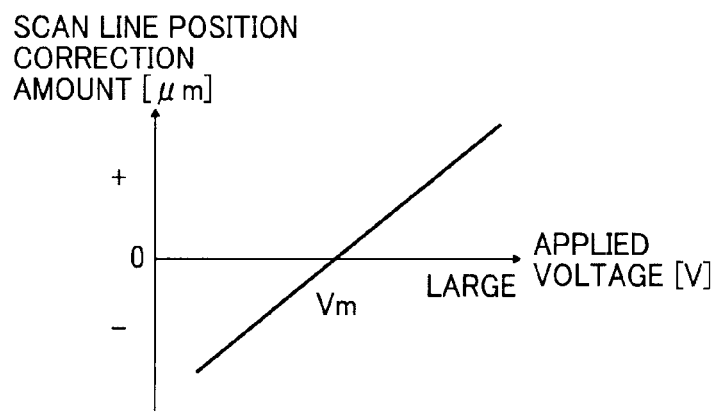
FIG. 17 shows a relation between the applied voltage to the electro-optic element in the optical scanning device in FIG. 11 and the scan line position shift amount of the scan line on the scan-target surface.

In the optical scanning device 100B, layout positions of the light source 11, coupling lens 11a, cylindrical lens 13, polygon mirror 14, scanning lenses 15a and 15b, reflection mirror 18, and photoreceptor drum 20 are fixed. Then, changes in the deflection angle of the laser beam in the electro-optic element 12' causes a position of the optical spot on the scan-target surface to change. Specifically, as illustrated in FIG. 17, it is possible to move and adjust the position of the optical spot on the scan-target surface, that is, a scan line on the photoreceptor drum 20, by changing the voltage to be applied to the electro-optic element 12'.

If a voltage is applied to the electrode 12e, it is preferred that an electric field perpendicular to a traveling direction of the interior-transmitting laser beam and corresponding to a main scanning direction be formed in the electro-optic crystal 12a'. According to this, the incident beam can be deflected in the sub-scanning direction effectively. The optical deflection by the electro-optic crystal 12a' has been disclosed in JP 3164002 and has been known to the public already. Therefore, its detailed description will be omitted.

In addition, it is preferred that the electro-optic element 12' be so disposed in the optical scanning device 100B that its optical deflection efficiency in the sub-scanning direction of the optical scanning device 100B is maximized. Accordingly, the electro-optic element 12' can deflect the laser beam effectively with respect to the applied voltage.

The electro-optic element 12' as described above has no mechanically movable part to deflect the light beam, and its responsiveness is related to the applied voltage only. Then, the electro-optic element 12' may sufficiently perform high-speed operation compared to the polygon motor or the liquid crystal element. In addition, because the electro-optic crystal 12a' is formed with a prism-shaped polarization domain inversion area, substantially same efficiency of the polygon motor with respect to the deflection angle is obtained. For example, because the scanning frequency of the polygon mirror 14 is 1 kHz and the response speed of the electro-optic element 12 is 100 kHz being a high speed, positional shift detection and position correction of the scan line is enabled while writing the scan line, which will be described later. In addition, the response speed of the liquid crystal is approximately 1 kHz, and therefore, the liquid crystal cannot perform such a real-time positional shift correction.

In addition, the electro-optic element 12' has an advantage in which because the element size is so small as to be one hundredth of the polygon motor, its layout in the optical scanning device 100B is easier.

In FIG. 11, the electro-optic element 12' is disposed between the light source 11 and the polygon mirror 14, but not limited thereto, the electro-optic element 12 can be disposed at an arbitrary position as far as it is placed between the light source 11 and the photoreceptor drum 20. In a case where the electro-optic element 12' is placed before the scan unit such as the polygon mirror 14 which is nearer to the light source 11 side, the laser beam is not scanned and the electro-optic element 12' may only have a beam diameter larger than that of the laser beam, and therefore is effective in view of the costs. In addition, when the electro-optic element 12' is placed after the coupling lens 11a, the substantially parallel light beam is incident to the electro-optic element 12'. Then, it is advantageous because the degradation of the beam shape can be prevented. On the other hand, the electro-optic element 12' is preferably disposed after the scanning unit (the polygon mirror 14) and in the side of the photoreceptor drum 20. In particular, the electro-optic element 12' is preferably disposed between the scanning lens 15b and the photoreceptor drum 20. In this case, the correction amount error due to the difference of the light path of the light beam of the positional shift detecting unit 16 and the light beam imaged on the scan-target surface after the beam splitting can be reduced. Alternatively, the electro-optic element 12' can be disposed outside the housing of the optical scanning device 100B. In this case, it is advantageous in the precision of positional shift correction because the correction of the scan line position including changes over time of those parts located before the photoreceptor drum 20 such as the reflection mirror 18 and other optical system, and optical scanning device 100B, is enabled.

In the present invention, the position of the electro-optic element 12' can be determined considering the balance between the precision in the correction and disposition of the above parts and components.

In addition, the optical scanning device 100B according to the present invention is capable of detecting a positional shift from an ideal position of the incident laser beam in the sub-scanning direction by changing the deflection angle of the laser beam in the electro-optic element 12' by a predetermined amount and by making the laser beam as the light beam B to be incident to the position detecting elements 16a, 16b, and 16c each serving as the positional shift detecting unit 16.

The positional shift detecting unit 16 includes a plurality of position detecting elements disposed parallel in the direction corresponding to the main scanning direction and disposed at positions within the main scan section on the photoreceptor drum 20. Accordingly, the positional shift in the scan line corresponding to within the actually scanned section in the predetermined image height can be performed.

FIG. 11 shows an example in which the positional shift detecting unit 16 is disposed within the optical housing of the optical scanning device 100B and three position detecting elements 16a, 16b, and 16c forming the positional shift detecting unit 16 are collaterally disposed in the vicinity of the reflection mirror 18 (more specifically, at positions shifted by a predetermined distance in the direction corresponding to the sub-scanning direction) and in the direction corresponding to the main scanning direction. As illustrated in FIG. 11, the position detecting element 16a is disposed at a start end of the scan line, the position detecting element 16b is disposed at an image height 0 in the center of the scan line, and the position detecting element 16c is disposed at an end of the scan line.

In addition, the positions of the position detecting elements 16a, 16b, and 16c are outside the optical path for the optical scanning starting from the electro-optic element 12' to the scan-target surface, and more specifically, are away from the optical path for the optical scanning of the laser beam directing to the scan-target surface or the photoreceptor drum 20 in the direction corresponding to the sub-scanning direction, and may be the positions into which the laser beam (the light beam B) deflected by the electro-optic element 12' can be incident.

Accordingly, the light beam B strikes the position detecting elements 16a, 16b, and 16c, at least with a predetermined timing, whereby the positional shift of the scan line formed by the light beam A incident onto the photoreceptor drum 20 and forming an image, can be detected at each of the image heights at which the position detecting elements 16a, 16b, and 16c are disposed.

The position detecting elements 16a, 16b, and 16c each are optical sensors to output difference of the positions between an ideal position into which the optically designed laser beam should be incident and an actual position into which each laser beam actually is incident, as a detection result.

Thus, according to the positioning of the these position detecting elements 16a, 16b, and 16c, the registration shift error of the scan line in the sub-scanning direction can be detected by using at least one position detecting element among three position detecting elements 16a, 16b, and 16c, the scan line skew can be detected by using at least two position detecting elements, and the scan line tilt can be detected by using at least three position detecting elements. Thus, by disposing at least three position detecting elements, the registration shift error, skew and tilt from a desired scan line can be detected.

The position detecting elements can be positioned, as illustrated in FIG. 11, after the scan lens 15b, but not limited thereto, and can be disposed at other places as far as it is positioned after the electro-optic element 12'. Alternatively, the position detecting elements can be disposed away from the light path of the laser beam to the scan-target surface or the photoreceptor drum 20 in a direction corresponding to the sub-scanning direction, and within a position into which the laser beam deflected by the electro-optic element 12 can be incident. However, the position detecting elements are preferably disposed at positions as near to the photoreceptor drum 20 as possible, because of being near to the actually formed image, so that a position correction can be performed with a higher precision.

In the present embodiment, the number of the position detecting elements is three. However, the number is not limited thereto, and one or more elements elongated in the main scanning direction can be used. Also, by expanding the area of the scan line to be detected by the position detecting elements, the positional shift of the scan line can be detected with a higher precision.

As illustrated in FIG. 11, the position controller 10b receives detection results of each of the position detecting elements 16a, 16b, and 16c of the positional shift detecting unit 16, and calculates to obtain a positional shift correction amount of the scan line on the scan-target surface of the photoreceptor drum 20 based on the detection results.

Specifically, the position controller 10b serves to, to be described later in the scan line control, calculate a positional shift correction amount in the sub-scanning direction of the scan line on the scan-target surface of the photoreceptor drum to offset the positional shift amount in the scan line detected by either of the position detecting element 16a, 16b, and 16c.

In addition, the voltage controller 10c is connected to the position controller 10b. When the correction amount (that is, the positional shift correction amount in the sub-scanning direction of the san line) is input from the position controller 10b, the voltage controller 10c changes the voltage to be applied to the electro-optic element 12' based on the relation, specific to the electro-optic element 12', between the applied voltage to the electro-optic element 12' and the deflection angle of the laser beam (as illustrated in FIG. 15) and based on the relation between the applied voltage to the electro-optic element 12' and the scan line position shift amount (the correction amount) by the laser beam on the scan-target surface (as illustrated in FIG. 17) obtained by the relation between the deflection angle of the laser beam in the electro-optic element 12' and the previously calibrated scan line position shift amount (the correction amount) by the laser beam on the scan-target surface.

As described above, the present invention employs an electro-optic element 12' capable of performing a high speed operation, the time required for correction of the scan line in the sub-scanning direction substantially corresponds to an electrical time to calculate a position, in the sub-scanning direction, of the optical spot incident to the photoreceptor drum 20 based on the scan position data (the positional shift amount) obtained by the positional shift detecting unit 16, whereby a real-time positional shift correction can be performed. In addition, in the scan line on the scan-target surface, it is possible to correct the sub scan line position by each position (each dot) in the main scanning direction.

Then, in the optical scanning device 100B according to the present invention, the controller including the position controller 10b and the voltage controller 100c performs the scan-line positional shift detection and the scan-line correction control. While the laser beam is being imaged/scanned on the scan-target surface of the photoreceptor drum 20, the controller detects the positional shift from an ideal position in the sub-scanning direction of the laser beam (the light beam B) incident to the positional shift correcting unit 16, which is the scan-line positional shift detection. The controller controls the refractive index of the light beam B within the electro-optic element 12' based on the detection result by the positional shift detecting unit 16 to adjust the deflection amount of the laser beam from the electro-optic element 12', and corrects the positional shift in the sub-scanning direction of the laser beam (the light beam A) on the scan-target surface.

Herein, the controller preferably performs the scan-line positional shift detection and the scan-line correction control simultaneously, while the laser beam being imaged and scanned on the scan-target surface. By performing the positional shift detection and optical scanning simultaneously, there is no standby time to occur for the positional shift correction of the scan line and the correction can be performed speedily.

Scan-Line Positional Shift Detection

In the optical scanning device 100B, the scan-line positional shift detection is performed as follows:

(S21) Among the light beams from the light source 11, the linear polarized beam component with a polarization direction α which is perpendicular to the polarization direction β with high deflection efficiency of the electro-optic element 12' (α⊥β) is deflected at an angle as shown in FIG. 15, and the deflected linear polarized beam component, the light beam B, is incident into the position detecting element (herein, the position detecting element 16a) of the positional shift detecting unit 16.

(S22) The position detecting element 16a into which the light beam B is incident detects a difference between the incident position of the light beam B and the ideal incident position by the optical design, as a positional shift amount, and outputs it to the position controller 10b.

(S23) The position controller 10b calculates a positional shift amount of the scan line on the scan-target surface of the photoreceptor drum 20 based on the detection result of the position detecting element 16a.

Scan-Line Correction Control

In the optical scanning device 100B, the scan-line correction control is performed as follows:

(S24) The controller determines whether the positional shift correction of the scan line is necessary or not, based on the calculation result (the positional shift amount) of the position controller 10b. For example, the positional shift correction control of the scan line may be configured to be performed upon the positional shift correction amount exceeding a predetermined threshold value. If it is determined that the positional shift correction is not necessary, a series of control is terminated.

(S25) If the controller determines that the positional shift correction of the scan line is necessary, the voltage controller 10c applies voltage of which value is determined based on the calculation result of the positional shift correction amount by the position controller 10b, to the electro-optic element 12' (see FIG. 17). Accordingly, among the laser beams from the light source 11, the linear polarized beam component with a polarization direction α which is parallel to the polarization direction β with high deflection efficiency of the electro-optic element 12' (α//β) is deflected in the electro-optic element 12' at an angle adjusted based on the relation as shown in FIG. 15, and the deflected linear polarized beam component, the light beam A, is incident into the photoreceptor drum 20. As a result, the positional shift of the scan line in the sub-scanning direction on the scan-target surface of the photoreceptor drum 20 is corrected.

The controller preferably performs the scan-line positional shift detection and the scan-line correction control with a predetermined timing based on the scanning frequency (or the linear velocity of the scan line) of the scanning means (the polygon mirror 14) and the detection positions (the positions of the position detecting elements 16a, 16b, and 16c) in the direction corresponding to the main scanning direction of the positional shift detecting unit 16. For example, in the optical scanning device 100B as illustrated in FIG. 11, based on the positional shift correction amount calculated from the detection result at the position detecting element 16a into which the laser beam is first incident among three position detecting elements 16a, 16b, and 16c, the positional shift correction is performed relative to the scan line in the section up to the second position detecting element 16b. Then, based on the positional shift correction amount calculated from the detection result at the second position detecting element 16b, the positional shift correction is performed relative to the scan line in the section up to the third position detecting element 16c. According to such processing, any standby time for the positional shift correction is not required, to thus obtain an optimal scan line of which positional shift is corrected in a real time.

As described above, the optical scanning device according to the present invention employs an electro-optic element having optical anisotropy and operable at a high speed. Thus, during scanning of the laser beam, that is, during the optical writing to the photoreceptor drum 20, detecting the positional shift amount of the laser beam (or the scan line) from the ideal position and performing positional shift correction based on the detection result can be done simultaneously. Thus, without being affected by the environmental change such as heat, a real-time positional shift correction of the scan line can be realized. In addition, by performing the light beam splitting and the scan line positional shift correction with one electro-optic element 12', the space in the device can be reduced. In addition, the position correction of the scan line can be performed by each dot in the image.

Third Embodiment

Before explaining the optical scanning device according to a third embodiment of the present invention, conventional problems related to the positional shift correction of the scan line including the scan line skew and tilt will now be described.

Figure 18:
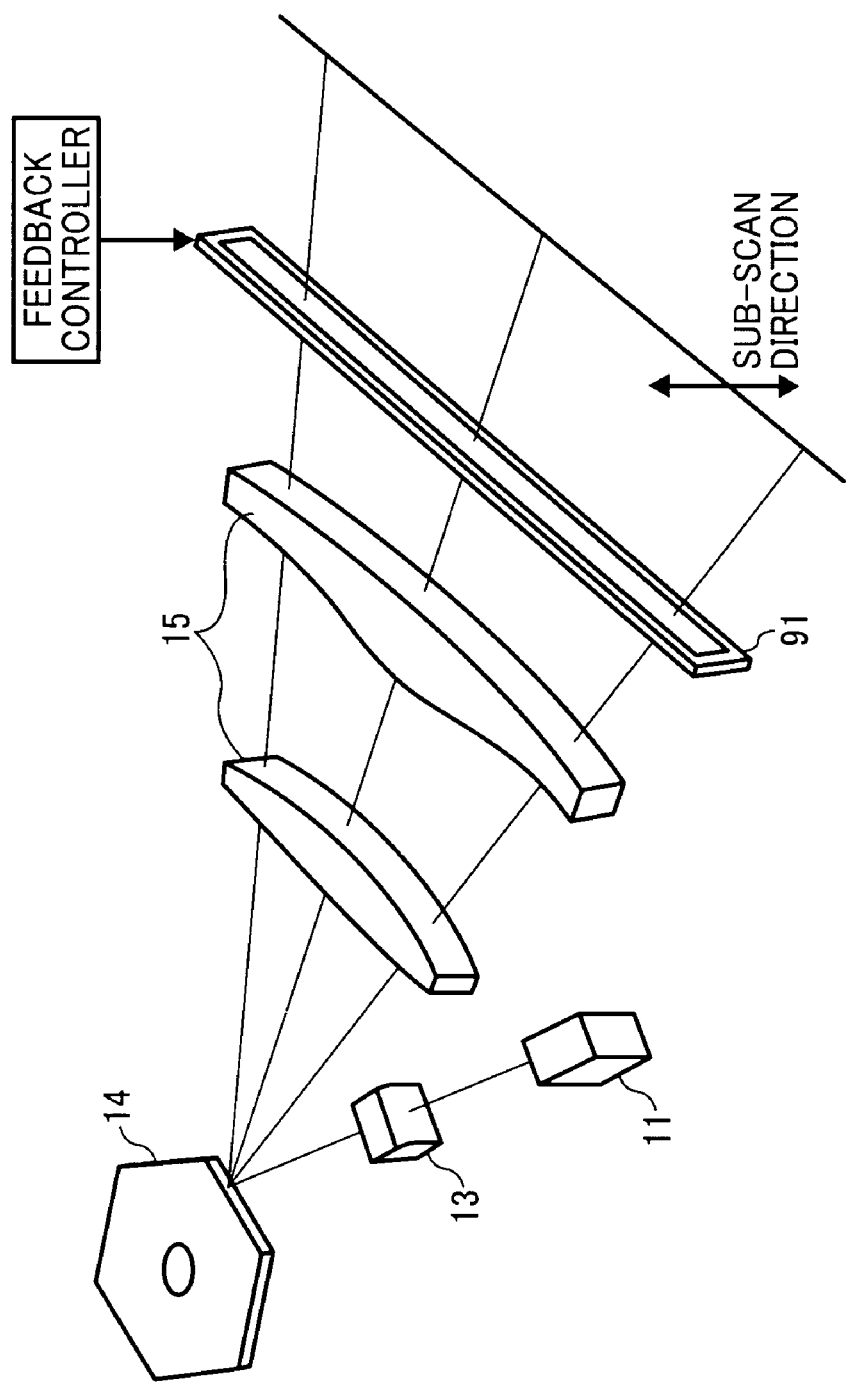
FIG. 18 is an oblique perspective view illustrating a conventional optical scanning device.

JP-4170637 and JP-2006-133287-A disclose an optical system to correct a scan line positional shift using a liquid crystal deflection element, a type of electro-optic element. FIG. 18 is a schematic view of the optical scanning device including the disclosed type of scan-line positional shift correction system.

As described in FIG. 18, the light beams emitted from the light source 11 turn into parallel light beams (or slightly converged or diverged beams) by a collimator lens, not shown in FIG. 18, and are imaged as a linear image elongated in the main scanning direction on a reflection surface of the polygon mirror 14, an optical scanning means, by the cylindrical lens 13 which is a linear image forming optical system (having a positive power in the sub-scanning direction only). Then, the light beam deflected by the polygon mirror 14 turns into a converged light beam at constant velocity on the scan-target surface by the scanning lens 15, the scanning and imaging optical system. In this case, the light beam which has transmitted through the liquid crystal deflection element 91 is deflected in the sub-scanning direction, whereby the skew can be corrected. Herein, the liquid crystal deflection element 91, as disclosed in JP-4170637 and JP-2006-133287-A, is disposed in the latter step than the scanning imaging optical system, and its shape preferably is elongated. The principle of the liquid crystal deflection element 91 has been already disclosed in the above referenced documents, and the detailed description thereof is omitted.

Figure 19:
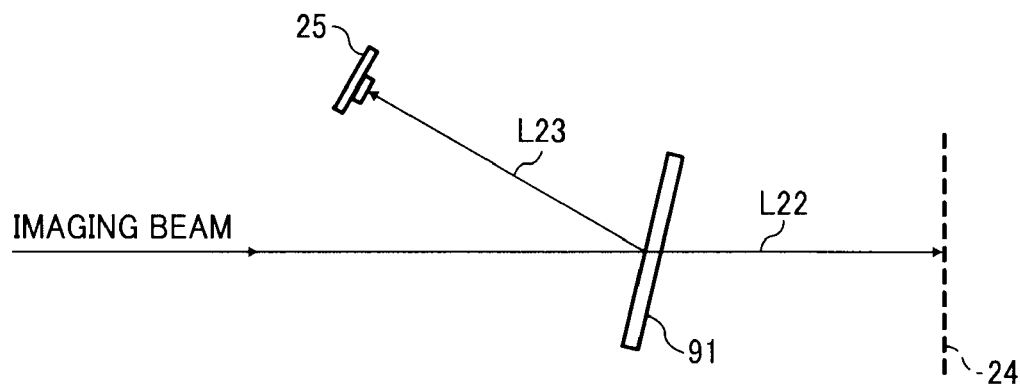
FIG. 19 is a cross-sectional view illustrating a scan-line positional shift detecting system in the background art.

FIG. 19 shows a conventional method to detect a scan line positional shift amount as disclosed in JP-4170637 and JP-2006-133287-A. Both of JP-4170637 and JP-2006-133287-A employ a detection unit using a reflected light of the liquid crystal deflection element as one of detection methods of the scan line positional shift amount. Specifically, the liquid crystal deflection element 91 splits the imaging light beam into two beams, one is a light beam L22 transmitting through the liquid crystal deflection element 91 and another, a light beam L23 reflected on a surface of the liquid crystal deflection element 91. The transmitted light beam L22 is made incident to the scan-target surface 24 of the photosensitive medium, and the reflected light beam L23 is made incident to the scan line positional shift detection system 25 to thus obtain the scan line positional shift amount. Based on the obtained detection result, the deflection of the light beam in the sub-scanning direction in the liquid crystal deflection element 91 is adjusted by a feedback control. In this case, the liquid crystal deflection element 91 is used as a beam splitter.

By using the reflected light of the liquid crystal deflection element 91 effectively, without providing any additional part, the positional shift amount of the scan line being written on the scan-target surface 24 of the photosensitive medium can be detected in real time. However, in the present method, a lengthy or large-sized liquid crystal deflection element needs to be provided, resulting in a drastic cost rise.

In addition, considering the effect of the main scan line skew occurring due to the scanning optical system, it is required that the liquid crystal deflection element as an electro-optic element to correct positional shift of the scan line has a large light beam transmission area (a width in the sub-scanning direction). However, the electro-optic element such as a liquid crystal deflection element can be operated at the lower voltage when the light beam transmission area is smaller, and then, it is preferred that the electro-optic element be smaller in size. To make the light beam transmission area of the electro-optic element smaller, the electro-optic element may preferably be provided to the light source side than to the movable light deflection system side.

As described above, the correcting unit (the electro-optic element) to correct the positional shift of the scan line is preferably disposed nearer to the side of the light source than to the scanning optical system. As a result, the compact scan line positional shift correcting unit can be used, thereby reducing a cost. However, in this case, the scan line positional shift detection using the reflected light of the liquid crystal deflection element (the scan line positional shift correcting unit) as disclosed in JP-4170637-B and JP-2006-133287-A is not realizable.

Therefore, the present invention provides a beam splitter at a side nearer to the scan-target surface than to the optical scanning system in which the light beam is split into two; one is focused on the scan-target surface and the other to the scan-line positional shift detecting system, thereby detecting the scan-line positional shift amount.

In this case, it is preferable that the actual scan line positional shift amount on the photosensitive medium be highly correlative to the amount detected by the scan line positional shift detection system. To maintain this high correlation, it is necessary that the light beam converged onto the photosensitive medium and that focused on the scan line positional shift detection system pass through the same light path; however, it was not realizable by use of the beam splitter.

Figure 20:
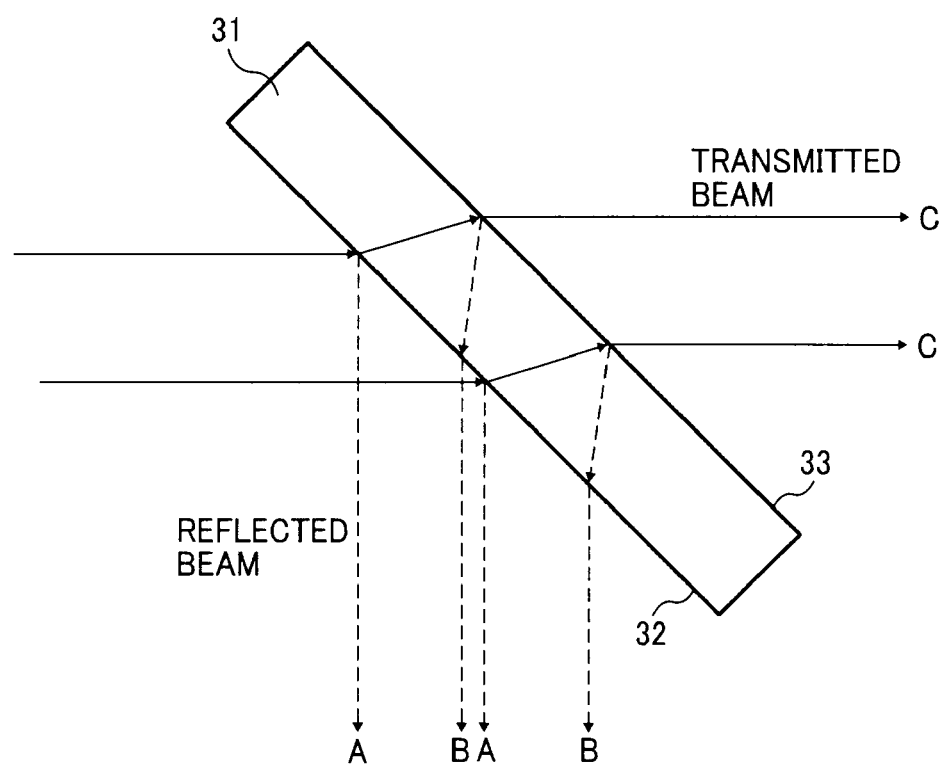
FIG. 20 is a cross-sectional view illustrating beam splitting of the beam splitter in the background art.

FIG. 20 is a cross-sectional view illustrating light beam splitting using a beam splitter.

The light beam incident in a beam splitter 31 is split into a light beam A reflected at a incidence plane 32 of the beam splitter; a light beam B which transmits through the incidence plane 32, is reflected by a transmitting surface 33, and transmits again through the incidence plane 32; and a light beam C which transmits through the incidence plane 32 and the transmitting surface 33. Herein, the light beam reflected more than twice an interior of the beam splitter 31 is assumed to be negligible and is not considered. Among these three light beams, the light beams A and B are regarded as reflecting light beams from the beam splitter 31 and the light beam C is regarded as a transmitted light beam.

Herein, as apparent from FIG. 20, the light paths of the light beams A, B, and C in the beam splitter 31 are not coincident. For example, the light beam A does not receive any effect of the transmitting surface 33 differently from the light beams B and C. Then, the light beam A does not affect the scan line positional shift even though how badly the transmitting surface 33 is deformed. The light beams B and C each have different light path lengths within the beam splitter 31. Then, if there is a spatial change in the refractive index in the beam splitter 31, the light beam B having a longer light path length tends to be affected by the spatial change. Further, the light path B transmits through the incidence plane 32 twice, and therefore, is affected by the deformation of the incidence plane 32.

In a case where there is a large difference between the surface deformation amount related to the main scanning direction of the incidence plane 32 and the surface deformation amount related to the main scanning direction of the transmitting surface 33 due to the manufacturing error and the like, or in a case where there is a large variation in the refractive index related to the main scanning direction due to the internal distortion, effects of the light path difference are aggravated. The correlation between the actual scan line positional shift amount on the photosensitive medium and the amount detected by the scan line positional shift detection system is reduced. Therefore, it becomes difficult to detect the scan line positional shift amount at a certain main scan image height with higher precision in real time.

The inventors of the present invention made further efforts to improve the conventional problems in the scan line positional shift correction system to thus obtain an optimal optical scanning device.

Specifically, the optical scanning device according to the present invention includes: a light source to emit laser beams; an optical system to collimate the laser beams emitted from the light source; a scanning unit and a scanning imaging optical system to deflect/scan the collimated light beams to form an optical spot on a scan-target surface; a positional shift detecting unit to detect a scan line skew as to the incident light beams; a diffraction grating mirror to reflect with diffraction phenomenon the light beams deflected and scanned in the scanning unit and the scanning and imaging optical system, and split the light beams into a light beam focused on the scan-target surface and a light beam focused on the positional shift detecting unit; and an electro-optic element disposed in the light path between the light source and the diffraction grating mirror, of which refractive index inside thereof is controlled by the electrical means based on the detection result of the positional shift detecting unit, and adjusting the direction of the light beam transmitting through the interior thereof.

The third embodiment of the present invention will now be described with reference to FIGS. 21 and 22.

Figure 21:
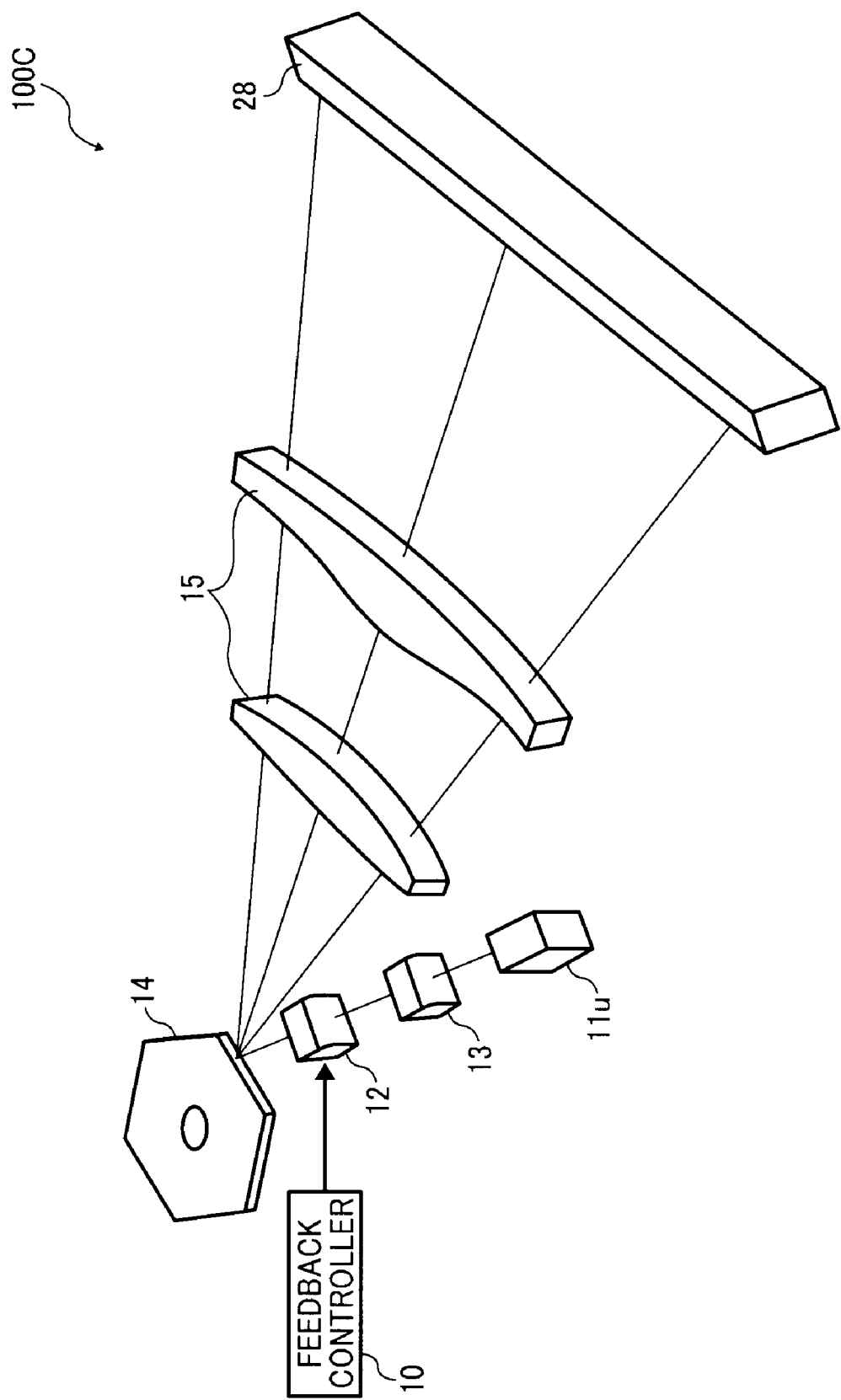
FIG. 21 shows a general configuration of an optical scanning device according to a third embodiment of the present invention.
Figure 22:
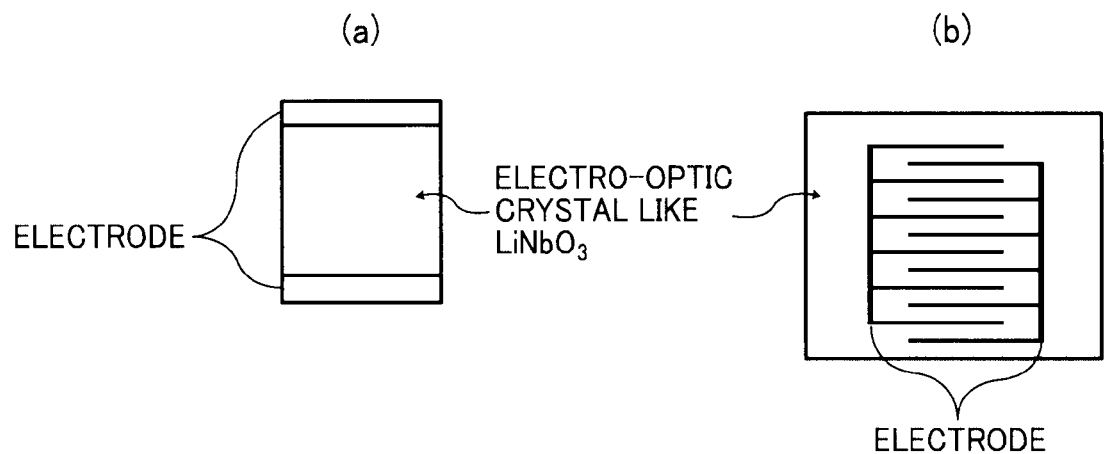
FIGS. 22(a) and 22(b) are schematic views of an opposite electrode type electro-optic element and a comb-like electrode type one.

FIG. 21 is an oblique perspective view illustrating a structure of an optical scanning device according to the present invention. A structure from a light source unit 11*u* to a diffraction grading mirror 28 being a light beam splitting means is illustrated in FIG. 21. A light path after the diffraction grating mirror 28 will be described later with reference to FIG. 22.

An optical scanning device 100C includes: the light source unit 11*u* including a light source 11 and a coupling lens 11*a*; an aperture stop, not shown; a cylindrical lens 13; an electro-optic element 12; and a polygon mirror 14. As illustrated in FIG. 21, the laser beam or laser light emitted from the light source unit 11*u* is parallel light beam (or otherwise, slightly converged or diffused light beam), which passes through the aperture stop to obtain a desired shape of optical spot on the scan-target surface, is incident in the cylindrical lens 13 being a linear image forming optical system having a positive power in the sub-scanning direction only, is converged in the sub-scanning direction only, passes through the electro-optic element 12 to then be imaged as a long linear image in the main scanning direction in the vicinity of the deflected reflection surface of the polygon mirror 14, a scanning means.

Herein, the scan line controller 10 as a feedback control unit electrically controls the refraction index of the interior of the electro-optic element 12 based on the detection result of the positional shift detecting unit 16, whereby the direction of the light beam which transmits through an interior of the electro-optic element 12 is adjusted. The electro-optic element 12 may be formed of a liquid crystal element as described above, but may be an element using the following electro-optic effect.

Exemplary Structure of Electro-Optic Element 12

In general, a phenomenon in which refractive index changes by applying an electric field to a certain substance is called an electro-optic effect. One of the substances including the electro-optic effect $LiNbO_3$ crystal is famous for this reason. By applying the electric field to such a substance from externally, the substance of which the refractive index is changed may be used as an electro-optic element. The electro-optic elements are divided into two types; one is a bulk type and the other, a waveguide type. The bulk type electro-optic elements are generally divided into two types; one is an opposite electrode type (see FIG. 22(a)) and a comb-like electrode type (see FIG. 22(b)).

Figure 23:
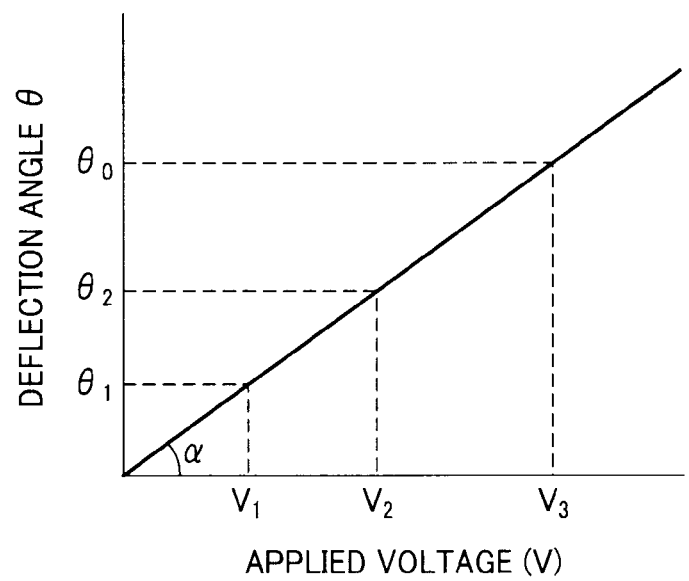
FIG. 23 is a graph showing a relation between a voltage applied to the electrode of the electro-optic element in FIG. 22 and a deflection angle of the transmitted light beam.

As illustrated in FIG. 23, such an electro-optic element 12 can linearly change the deflection angle in the main scanning direction of the light beam which transmits through the electro-optic element 12 directly with applied electric field or applied voltage. Positions of the light source unit 11u, cylindrical lens 13, electro-optic element 12, polygon mirror 14, scanning lens 15 being an imaging optical system, diffraction grating mirror 28 and the scan-target surface (of the photoreceptor drum 20) are fixed. Then, according to the change in the deflection angle of the light beam, the position of the light beam or the optical spot on the scan-target surface is varied. Specifically, according to the change in the voltage applied to the electro-optic element 12, the position of the optical spot on the scan-target surface (that is, the scan line on the photoreceptor drum 20) varies.

The electro-optic element 12 is disposed between the cylindrical lens 13 and the polygon mirror 14. If disposed in the side of the scan-target surface than the polygon mirror 14, a larger electro-optic element needs to be provided. Then, by disposing it at the light source side than the polygon mirror 14, a compact-sized electro-optic element is realized. In addition, the position of the electro-optic element 12 is not necessarily between the cylindrical lens 13 and the polygon mirror 14, and may be disposed between the coupling lens and the light source, or the coupling lens and the cylindrical lens 13. Or otherwise, the electro-optic element 12 can be integrally formed with those elements. By integrally forming the elements, the entire optical system may be formed in a compact size. This may be applied to the first and second embodiments.

Subsequently, in accordance with the rotation of the polygon mirror with a constant velocity, the light beam reflected by the deflection reflection surface turns into a deflected light beam deflecting with a constant angular velocity, transmits through an fθ lens, a scanning lens 15, formed of two lenses, and reaches the diffraction grating mirror 28.

The diffraction grating mirror 28 has an elongated shape in the main scanning direction as illustrated in FIG. 21, and splits the light beams to be converged on the scan-target surface and the positional shift detecting unit 16a serving as a sub-scan difference detecting element.

Figure 24:
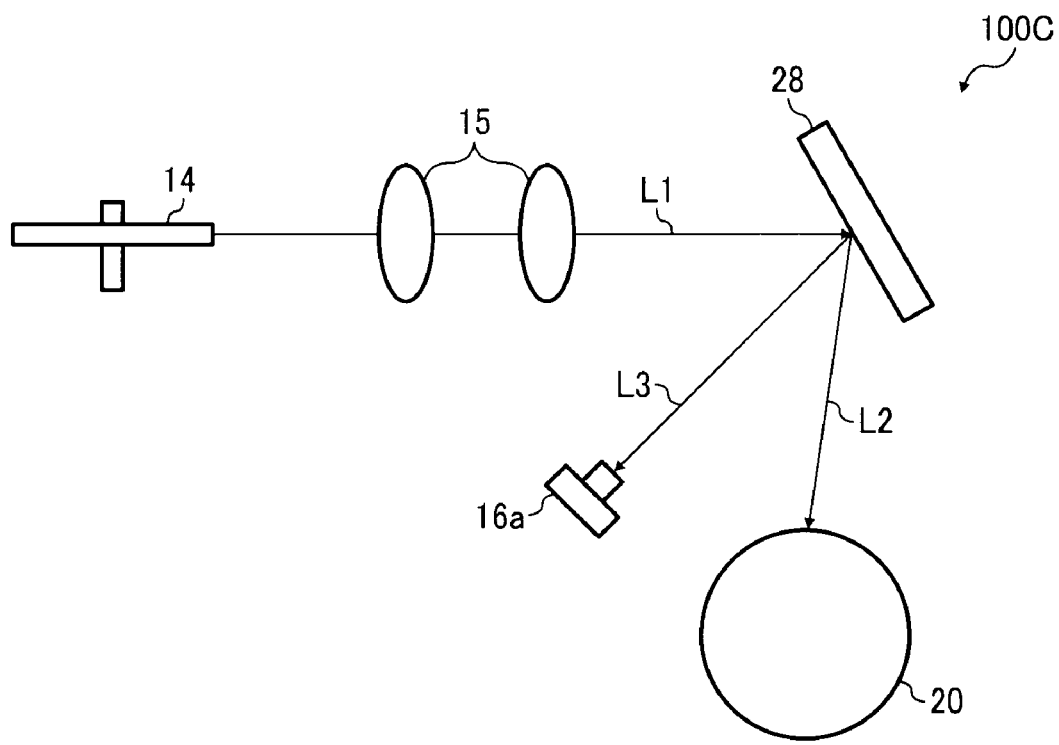
FIG. 24 is a perspective view illustrating the structure of the optical scanning device in FIG. 21.

FIG. 24 is a side view illustrating a light path of the light beam emitted from the polygon mirror 14 toward the scan-target surface (the photoreceptor drum 20) and toward the position detecting element (the positional shift detecting unit 16a serving as a sub-scan difference detecting element).

As illustrated in FIG. 24, the light beam L1 which is incident to the diffraction grating mirror 28 is split into a plurality of light beams, and at least one light beam L2 among split light beams is converged on the photoreceptor drum 20, and another light beam L3 is converged on the position detecting element 16a. Specifically, the function of the reflection mirror (which is the reflection mirror 18 in FIGS. 1 and 11) to reflect the laser beam from the light source unit 11u to the scan target surface (the photoreceptor drum 20) is substituted by the diffraction grating mirror 28 to reflect with diffraction phenomenon the laser light beam L1 deflected and scanned in the scanning unit and the scanning and imaging optical system, and to split the laser beams into at least the laser light beam L2 focused on the scan-target surface (the photoreceptor drum 20) and into the laser light beam L3 focused on the positional shift detecting unit (the position detecting element 16a), which is a splitting function.

Figure 25:
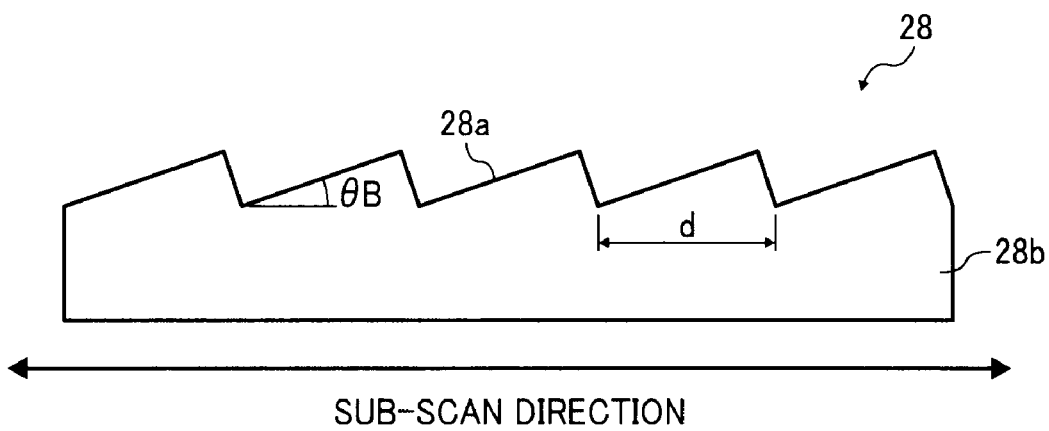
FIG. 25 is a cross-sectional view illustrating a structure of a diffraction grating mirror used in the optical scanning device in FIG. 21.

As described above, the diffraction grating mirror 28 serves to reflect the incident beam L1 with diffraction phenomenon and to split the beam L1 into a plurality of beams. As illustrated in FIG. 25, the diffraction grating mirror 28 includes a base 28b and a reflective layer 28a. The base 28b includes fine sawtooth-shaped grooves on its surface as a reflection surface. The reflective layer 28a is a coating layer coated with a reflective film formed of Aluminum, for example, on the surface of the sawtooth-like grooved surface of the base 28b. The fine groove shapes of the surface of the base 28b may include a stepwise groove, Fresnel stepwise groove, sinusoidal-shaped groove, and the like.

The diffraction grating mirror 28 generates a plurality of diffracted light beams corresponding to a number of times of diffraction due to its fine structure. FIG. 24 shows two light beams L2 and L3 only; however, more light beams are actually generated.

When a pitch d, a height $d \sin \theta B$ (here, $\theta B$ is a diffraction angle), and an incidence angle of the light beam L1 to the diffraction grating mirror 28, of the fine structure formed on the surface of the base 28b are appropriately set, the diffraction grating mirror 28 can distribute the light beams with an intensity corresponding to each diffraction number of times in the diffracted light beams. Among the diffracted light beams distributed by the diffraction grating mirror 28, it is recommended that the incidence angle and diffraction angle are set such that the light beam with a high intensity is converged onto the photoreceptor drum 20 as a scan-target surface.

The light beam diffracted in the diffraction grating mirror 28 is generated by the surface reflection of the diffraction grating mirror 28, and thus, the light beam diffracted at any diffracted number of times does not enter the diffraction grating mirror 28. Then, compared to the previously described light beam splitting element such as a beam splitter, the split light beams at any number of times of diffraction are affected only by the variation in the main scan skew determined by the diffraction reflection surface of the diffraction grating mirror 28, and the light path is constant. Then, the main scan skew amount of the light beam converging to the photoreceptor drum 20 may have a high correlation with that of the light beam converging to the position detecting element 16a. Specifically, when the light beam L3 on the surface of the position detecting element 16a is linearly scanned, it is guaranteed that the light beam L2 on the surface of the photoreceptor drum 20 is linearly scanned.

The position detecting element 16a is an optical detection sensor to detect a skew of the scan line as to the incident light beam L3. In the present embodiment, an elongated planar solid-state image sensor is used. On this planar solid-state image sensing device, photo-detectors divided in the planar state are provided with no space therebetween. It is possible to detect to which photo-detector of the planar solid-state image sensing device the light beam L3 for detecting the scan line positional shift is incident.

Here, the electro-optic element 12 is controlled by the scan line controller 10 as a feedback controller based on the scan line positional shift amount detected by the position detecting element 16a as follows.

First, as a position detecting element 16a, the elongated planar solid-state image sensing device is formed of Nx pieces of photo-detectors disposed in the main scanning direction and Ny pieces of photo-detectors disposed in the sub-scanning direction. Then, it is assumed that the light beam is converged at a photodetector which is the nx-th in the main scanning direction ($1 \leq nx \leq Nx$) and the ny-th in the sub-scanning direction ($1 \leq ny \leq Ny$). This converging position is called as an address of the photodetector and is represented as (nx, ny) in a simplified manner.

Subsequently, the address to which the light beam is converged on the next address nx+1 in the main scanning direction is assumed to be (nx+1, ny'). Specifically, when the adjacent pixel in the main scanning direction is scanned, there is a shift of ny'−ny in the main scanning direction.

To simplify the description, it is assumed that the optimal main scan line satisfies a relation ny=ny' over all main scan image height, that is, the elongated direction of the planar solid-state image sensing device is assumed to be parallel to the optimal scan line's main scanning direction. If it is uneven not being parallel, the uneven component can be corrected.

Thus, the scan line positional shift amount (or more precisely, the differential variation) can be represented by "ny'−ny". According to the largeness of this differential variation in ± of the scan line positional shift amount, the largeness or ± (positive or negative) of the voltage to be applied to the electro-optic element 12 disposed between the cylindrical lens 13 and the polygon mirror 14 is adjusted, thereby causing the angle of the light beam to be emitted from the electro-optic element 12 to be deflected relative to the sub-scanning direction. Specifically, the scan line controller 10 formed of a CPU and micro computer adjusts the voltage amount to be applied to the electro-optic element 12 according to the scan line positional shift difference.

The light path of the light beam L2 converging to the photoreceptor drum 20 and the light beam L3 to detect the scan line positional shift which is converged on the position detecting element 16a is common in a section from the light source unit 11u to the diffraction grating mirror 28 to split the light beams, and the correlation between the scan line positional shift amounts of the both light beams in the sub-scanning direction is kept high. Then, when the scan line positional shift is corrected so that the light beam L3 for the scan-line positional shift detection is linearly scanned on the positional shift detecting unit formed of the position detecting element 16a, the light beam converging to the photoreceptor drum 20 can be linearly scanned. Thus, by adjusting the voltage amount to be applied to the electro-optic element 12, an optimal scan line with less skew can be obtained on the photoreceptor drum 20, that is, the linear light beam scanning is obtained.

The present embodiment describes a case in which an elongated planar solid-state image sensing device is used as the position detecting element 16a and the scan line positional shift over all image height in the main scanning direction is measured. However, the one in which a plurality of planer or linear solid-state image sensing devices disposed on the scan line of the light beam L3 for use to detect the scan line positional shift are arranged in the scattered manner in the main scan image height is used as the position detecting element 16a to detect the scan line positional shift. Herein, it is preferable that the linear devices be disposed to have the number of pixels in the sub-scanning direction.

As described above, according to the optical scanning device embodied in the present invention, the plurality of light beams split by the diffraction grating mirror are configured to pass through the same light path. Accordingly, the actual scan line positional shift amount on the scan-target surface and the amount detected by the positional shift detecting unit are highly correlative to each other. Thus, the scan-line positional shift amount in the predetermined main scan image height can be detected with a high precision in real time, thereby enabling to correct the scan-line positional shift properly.

Subsequently, an image forming apparatus according to the present invention will now be described.

Figure 26:
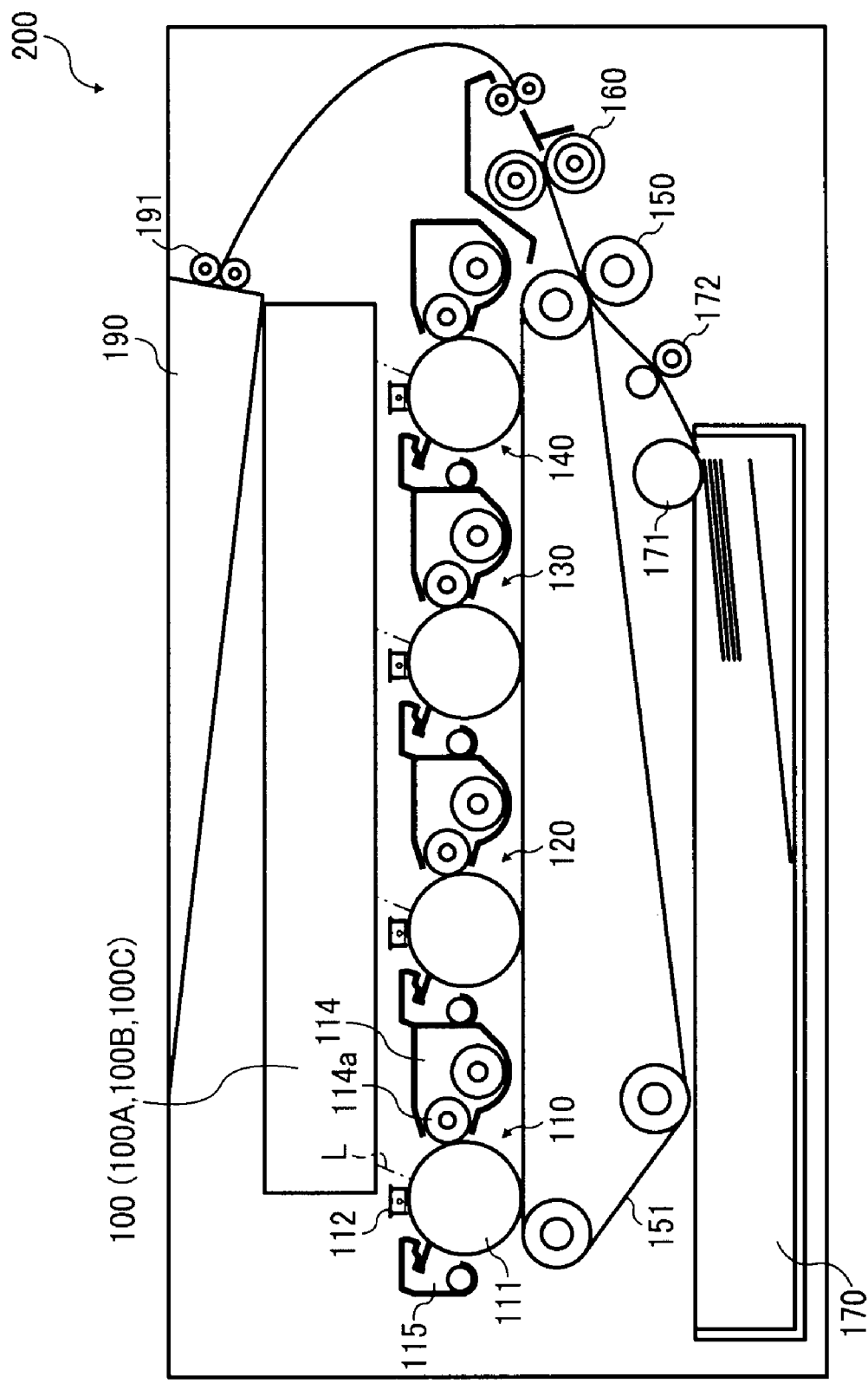
FIG. 26 is a cross-sectional view illustrating an image forming apparatus according to the present invention.

FIG. 26 shows an entire structure of an image forming apparatus according to the present invention using the optical scanning device embodied in the present invention.

As illustrated in FIG. 26, an image forming apparatus 200, an electrophotographic apparatus, includes image forming units 110, 120, 130, and 140 for each color, which are disposed on an intermediate transfer belt 151. A color image using toner is formed on the intermediate transfer belt 151, the color image is transferred to a paper sheet, a recording medium, being conveyed from a sheet feed unit 170, and the toner on the color image is fused by a fixing unit 160 with heat and pressure, whereby the color image is fixedly formed on the paper sheet.

There are four sets of image forming units 110, 120, 130, and 140, which correspond K-developing unit 110 including black toner, C-developing unit 120 including cyan toner, M-developing unit 130 including magenta toner, and Y-developing unit 140 including yellow toner, respectively.

As for the image forming unit 110, a photoreceptor drum 111 (that is, the photoreceptor drum 20 as illustrated in FIGS. 1, 11, and 24) is provided, and around the photoreceptor drum 111, are provided a charger 112 to charge a surface of the photoreceptor drum 111 with a high voltage, a developing device 114 to visualize a toner image by depositing charged toner from a developing roller 114a to a latent image recorded on the photoreceptor drum 111 by the optical writing of the optical scanning device 100 (that is, either of the optical scanning devices 110A, 110B, and 110C described above), and a cleaning unit 115 to scrape off and collect the toner remaining on the photoreceptor drum 111. Other image forming units 120, 130, and 140 each have the similar structure, and the description thereof will be omitted. The aforementioned real-time scan-line positional shift correction by the optical scanning device 100 can be applied to all the image forming units 110, 120, 130, and 140.

The intermediate transfer belt 151 is an endless belt stretched over a plurality of rollers and rotated thereby, and is disposed in contact with the photoreceptor drum of each of the image forming units 110, 120, 130, and 140, and a secondary transfer roller 150. In addition, a primary transfer roller, not shown, is disposed opposite the photoreceptor drum 111 and the like and in an inner side of the intermediate transfer belt 151.

A sheet of paper is picked out one by one from the sheet feed unit 170 in which paper is stacked, is conveyed via a registration roller 172 and reaches a nip portion in which the sheet is pressed by the secondary transfer roller 150 and its opposite roller while contacting the intermediate transfer belt 151, whereby an image is transferred to the sheet. Then, the sheet on which the image is transferred reaches the fixing unit 160 along a conveyance belt.

The fixing unit 160 serves to apply heat and pressure to the sheet which passes through a nip portion in which a fixing member heated at a predetermined temperature and a pressing member are contacted each other with a predetermined pressure.

When forming an image in the image forming apparatus 200, for example, the photoreceptor drum 111 in the image forming unit 110 is charged by the charger 112, the optical scanning device 100 applies light according to the image data and the electric potential on the photoreceptor drum 111 is dropped. The potential-dropped portion reaches the developing unit 114 by the rotation of the photoreceptor drum 111 and contacts a toner layer on the developing roller 114*a*, and thus, the charged toner attaches to the image portion.

The toner image on the photoreceptor drum 111 is then transferred to the intermediate transfer belt 151 at a portion in which the primary transfer roller presses the intermediate transfer belt 151 against the photoreceptor drum 111. In the similar manner, in each of the image forming units 120, 130, and 140, the toner image on the photoreceptor drum is transferred onto the intermediate transfer belt 151, and thus, a color toner image is formed. Then, the toner image conveyed according to the rotation of the intermediate transfer belt 151 is transferred onto the sheet at the position of the secondary transfer roller 150. The sheet on which the toner image is transferred is then conveyed to the fixing unit 160, the toner of the toner image is fused and fixed, with heat and pressure, onto the sheet and a color image is formed. The sheet on which the color image is formed is then ejected to a sheet ejection tray 190 by a sheet ejection roller 191.

As described above, the image forming apparatus in the present invention employs the optical scanning device 100 embodied in the present invention. Therefore, an optical scan line with less positional shift can be obtained, and as a result, an optimal image can be formed. In addition, the image forming apparatus 200 of the present invention optically writes images to each photoreceptor drum for the image forming units 110, 120, 130, and 140 using the optical scanning device 100 embodied in the present invention, and therefore, a high-quality image with less color shift can be obtained.

Additional modifications and variations of the present invention are possible in light of the above teachings. It is therefore to be understood that, within the scope of the appended claims, the invention may be practiced other than as specifically described herein.

What is claimed is:

1. An optical scanning device comprising:
   a light source;
   a scanning unit to deflect and scan a laser beam from the light source;
   an imaging optical system to focus the deflected and scanned laser beam to a scan-target surface;
   an electro-optic element, disposed in a light path between the light source and the scan-target surface, to electrically change a refractive index of an interior of the electro-optic element;
   a controller to control the refractive index of the interior of the electro-optic element and adjust deflection amount of the laser beam transmitted through the interior of the electro-optic element; and
   a positional shift detecting unit, disposed away from the light path from the electro-optic element to the scan-target surface, to detect a positional shift of an incident laser beam from an ideal position in a sub-scanning direction,
   an optical element disposed between the light source and the scan-target surface and which, while the laser beam is being focused on and scanned along the scan-target surface, splits the laser beam into a first laser beam directed to the positional shift detecting unit and a second laser beam directed to the scan-target surface, and
   wherein the controller adjusts a deflection amount of the laser beam from the electro-optic element based on a detection result obtained by the positional shift detecting unit and corrects a positional shift in the sub-scanning direction of the laser beam on the scan-target surface.

2. The optical scanning device as claimed in claim 1,
   wherein, while the laser beam is being focused on and scanned along the scan-target surface, the controller deflects the laser beam from the electro-optic element by a predetermined deflection amount by controlling the interior refractive index of the electro-optic element to enable the laser beam to strike the positional shift detecting unit and corrects a positional shift in the sub-scanning direction of the laser beam on the scan-target surface.

3. The optical scanning device as claimed in claim 2,
   wherein, while the laser beam is being focused on and scanned along the scan-target surface, the controller alternately performs scan line positional shift detection and scan line correction.

4. The optical scanning device as claimed in claim 1,
   wherein the electro-optic element has an optical anisotropy and splits the laser beam from the light source into a first laser beam incident to the positional shift detecting unit and a second laser beam incident to the scan-target surface; and
   wherein, while the laser beam is being focused on and scanned along the scan-target surface, the controller detects a positional shift in the sub-scanning direction of the laser beam incident to the positional shift detecting unit from an ideal position and corrects the scan line based on the detected positional shift amount.

5. The optical scanning device as claimed in claim 4,
   wherein, while the laser beam is being focused on and scanned along the scan-target surface, the controller simultaneously performs scan line positional shift detection and scan line correction.

6. The optical scanning device as claimed in claim 4,
   wherein a deflection angle of the laser beam incident to the electro-optic element is adjusted so as to correspond to the optical anisotropy in the electro-optic element.

7. The optical scanning device as claimed in claim 6,
   wherein the laser beam emitted from the light source is a linearly polarized light beam.

8. The optical scanning device as claimed in claim 1, further comprising:
   a diffraction grating mirror to reflect the laser beam from the light source unit to the scan-target surface and to diffract the laser light beam deflected and scanned in the scanning unit and the scanning and imaging optical system, and split the laser beams into at least the laser light beam focused on the scan-target surface and into the laser light beam focused on the positional shift detecting unit.

9. The optical scanning device as claimed in claim 1, wherein the positional shift detecting unit comprises a plurality of parallel position detecting elements deployed in the main scanning direction.

10. The optical scanning device as claimed in claim 1, wherein the positional shift detecting unit comprises a position detecting element elongated in the main scanning direction.

11. The optical scanning device as claimed in claim 1, wherein the positional shift detecting unit comprises at least one position detecting element disposed in an area within a scanning range in the main scanning direction of the scan-target surface.

12. The optical scanning device as claimed in claim 1, wherein the controller performs scan line positional shift detection control based on a scanning frequency of the scanning unit and the detection position in the direction corresponding to the main scanning direction obtained by the positional shift detecting unit.

13. The optical scanning device as claimed in claim 1, wherein the electro-optic element is disposed between the light source and the scanning unit.

14. The optical scanning device as claimed in claim 1, wherein the electro-optic element is integrally formed with at least one optical element disposed between the light source and the scanning unit.

15. The optical scanning device as claimed in claim 1, wherein the electro-optic element comprise an electro-optic crystal formed of one of a combination of Kalium (K), Tantalum (T) and Niobium (Nb); Lithium (Li) and Niobium (Nb); and Lithium (Li) and Tantalum (T).

16. The optical scanning device as claimed in claim 15, wherein the electro-optic crystal comprises a prism-shaped polarization domain inversion area.

17. The optical scanning device as claimed in claim 15, wherein the electro-optic element further comprises a pair of electrodes sandwiching the electro-optic crystal,
the electrodes generating an electric field perpendicular to a traveling direction of transit of the laser beam and corresponding to a main scanning direction in the electro-optic crystal when an electrical current is applied thereto.

18. The optical scanning device as claimed in claim 1, wherein the electro-optic element is disposed in the optical scanning device so as to maximize optical deflection efficiency in the sub-scanning direction of the optical scanning device.

19. The optical scanning device as claimed in claim 1, wherein the electro-optic element is disposed and fixed via a fixing member at a predetermined position in the optical scanning device.

20. An image forming apparatus comprising an optical scanning device as claimed in claim 1.

* * * * *